US012803161B2

(12) United States Patent
Stewart et al.

(10) Patent No.: US 12,803,161 B2
(45) Date of Patent: Nov. 17, 2026

(54) WIRELESS RECEIVER WITH MULTIPLE ANTENNA CONFIGURATIONS

(71) Applicant: Verizon Patent and Licensing Inc., Basking Ridge, NJ (US)

(72) Inventors: Robert Stewart, Point Pleasant, NJ (US); Amrit Bamzai, Livingston, NJ (US); Andrew Nicholas Toth, Telford, PA (US); Jonathan Simmons, Croton-on-Hudson, NY (US); Hyunno Yun, Melville, NY (US); Caleb Jones, Brooklyn, NY (US); Reid Schlegel, Brooklyn, NY (US); James Lanzilotta, Northport, NY (US); Anthony Camarda, Leesburg, VA (US); Ming Hung Hung, Hsinchu (TW); Po Chang Chu, Kaohsiung (TW); Ying Chih Liu, Hsinchu (TW); YuanYu Chen, Taichung (TW); Yi Chieh Lin, Hsinchu (TW)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 291 days.

(21) Appl. No.: 18/366,398

(22) Filed: Aug. 7, 2023

(65) Prior Publication Data

US 2025/0055184 A1 Feb. 13, 2025

(51) Int. Cl.
*H01Q 3/04* (2006.01)
*H01Q 1/08* (2006.01)
*H01Q 1/20* (2006.01)

(52) U.S. Cl.
CPC ............... *H01Q 3/04* (2013.01); *H01Q 1/084* (2013.01); *H01Q 1/20* (2013.01)

(58) Field of Classification Search
USPC .......................................................... 343/702
See application file for complete search history.

(56) References Cited

U.S. PATENT DOCUMENTS 7,173,571 B2 * 2/2007 Webb ..................... H01Q 3/005 343/882
12,021,294 B2 * 6/2024 Yoo ...................... H01Q 1/1228
2020/0119457 A1 * 4/2020 Fried ........................ H01Q 1/42

* cited by examiner

*Primary Examiner* — Alexander H Taningco
*Assistant Examiner* — Brandon Sean Woods

(57) ABSTRACT

Some implementations are directed to a wireless receiver. In some implementations, the wireless receiver may include a receiver body encompassing one or more antenna elements, a cover removably coupled to the receiver body, and a mounting bracket removably coupled to the receiver body. In some implementations, at least one of the one or more antenna elements, the cover, or the mounting bracket is movable with respect to the receiver body in order to align the wireless receiver with a signal path.

20 Claims, 13 Drawing Sheets

WIRELESS RECEIVER WITH MULTIPLE ANTENNA CONFIGURATIONS

BACKGROUND

A fixed wireless access (FWA) device, sometimes referred to as a wireless receiver, may be a device that provides access to a data network via a wireless communication network (e.g., a cellular network, such as a fifth generation (5G) and/or new radio (NR) network, a fourth generation (4G) and/or long term evolution (LTE) network, or the like). In this way, an FWA device enables fixed broadband access using radio frequencies instead of cables, and may be used to connect a premises to the Internet. One or more client devices at a premises may be in communication with the FWA device (e.g., via a router associated with a local area network (LAN)), and the FWA device may in turn be in communication with a base station or a similar network entity of the wireless communication network. The base station or similar network entity may provide connectivity to a data network (e.g., the Internet) via a core network.

DETAILED DESCRIPTION OF EXAMPLE EMBODIMENTS

The following detailed description of example implementations refers to the accompanying drawings. The same reference numbers in different drawings may identify the same or similar elements.

Figure 1:
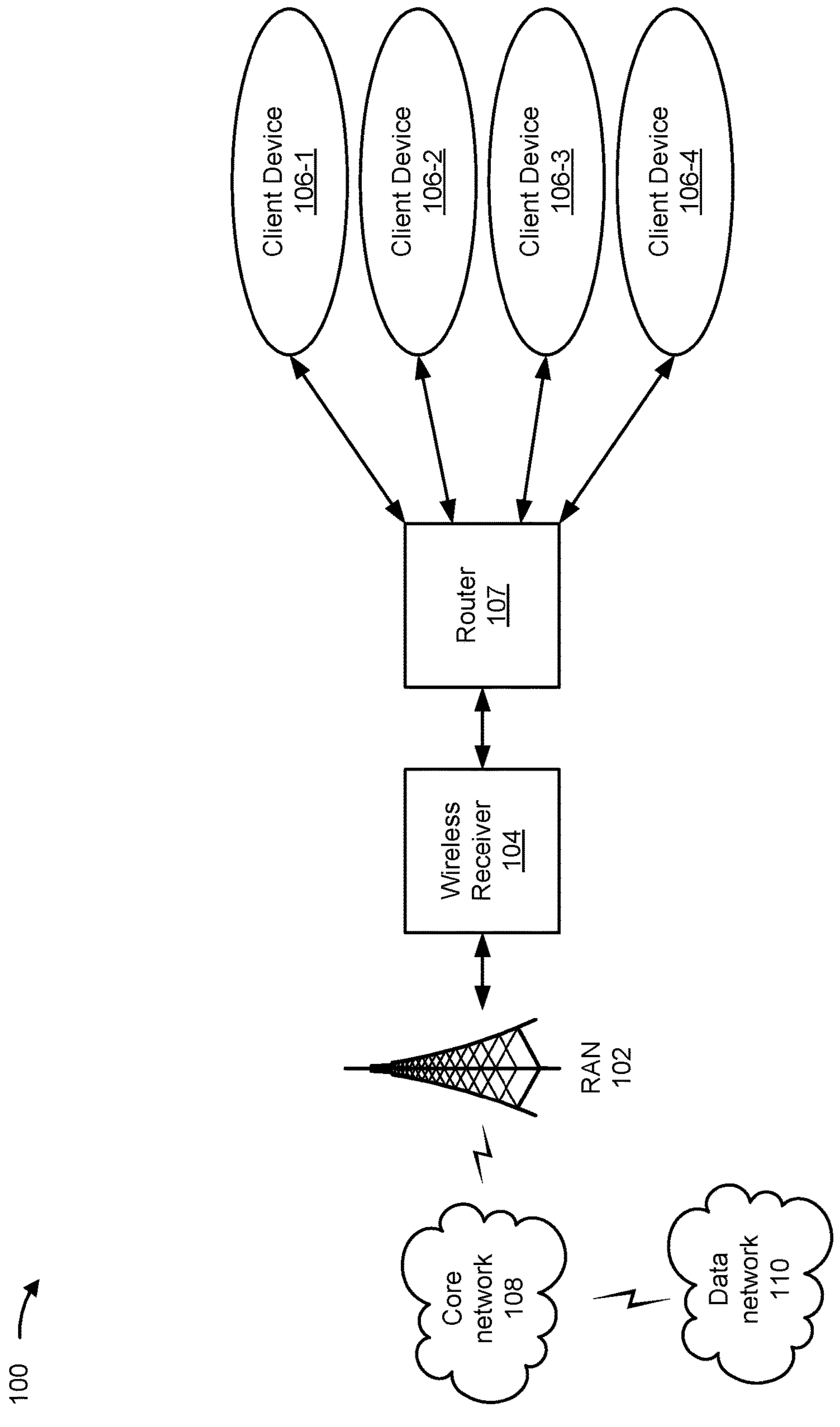
FIG. 1 is a diagram of an example associated with a fixed wireless device (FWA) architecture.

FIG. 1 is a diagram of an example 100 associated with a fixed wireless device (FWA) architecture. As shown in FIG. 1, example 100 includes a radio access network (RAN) device 102, a wireless receiver 104 (e.g., an FWA device), multiple client devices 106 (shown in FIG. 1 as four client devices, client device 106-1 through client device 106-4), and a router 107.

In some examples, the wireless receiver 104 may be located at a premises (e.g., a home or business), and may provide Internet connectivity to client devices 106 located at the premises. Example client devices 106 may be user equipments (UEs), personal computers (PCs), tablets, smartphones, gaming consoles, smart home devices, and/or similar client devices. The client devices 106 may communicate with the wireless receiver 104, such as via a local area network (LAN) (e.g., a local network associated with the router 107). For example, the client devices 106 may be in wireless or wired communication with the router 107, which may be in communication with the wireless receiver 104 via an Ethernet cable or a similar connection. The wireless receiver 104 may in turn communicate with the RAN device 102 (e.g., a base transceiver station, a radio base station, a node B, an eNodeB (eNB), a gNodeB (gNB), a base station subsystem, a cellular site, a cellular tower, an access point, a transmit receive point (TRP), a radio access node, a macrocell base station, a microcell base station, a picocell base station, a femtocell base station, or a similar device) or a similar radio frequency (RF) entity (e.g., an entity capable of communicating with the wireless receiver 104 via an RF spectrum). The RAN device 102 may be in communication with a core network 108, which may in turn provide connectivity to a data network 110 (e.g., the Internet). In this way, the wireless receiver 104 may provide Internet connectivity or similar data network connectivity to the client devices 106 (e.g., via the router 107) by establishing a wireless connection with the RAN device 102 or a similar RF entity.

In some examples, the wireless receiver 104 may need to be positioned in a specific orientation and/or a specific location in order to establish an optimal connection with the RAN device 102. For example, the wireless receiver 104 may include an antenna element (e.g., a transceiver element) configured to receive signals from the RAN device 102 and/or transmit signals to the RAN device 102. The antenna element may be fixed with respect to the wireless receiver 104, such that wireless receiver may need to be positioned in a precise location and with a precise orientation in order to establish a robust connection with the RAN device 102. For example, for a wireless receiver 104 disposed within a building, the wireless receiver may need to be disposed near a window that is facing the RAN device 102 and oriented such that the antenna element is facing towards the window. This may result in limited installation options and/or may require the wireless receiver 104 to be installed in a location in which less than all of the client devices 106 can be sufficiently serviced. Moreover, where the orientation of the window or other mounting surface does not align with a signal path to the RAN device 102, the wireless receiver 104 may also be limited in its ability to establish an optimal connection with the RAN device 102. This may result in increased communication errors and thus increased power, computing, and communication resource consumption for correcting communication errors, reduced bandwidth and/or increased latency with respect to the client devices 106, and otherwise inefficient usage of network resources.

Some implementations described herein enable a wireless receiver capable of operating in multiple configurations in order to align a signal path between the wireless receiver and a RAN device, and thus establish a robust connection with a RAN device or a similar RF entity. In some implementations, the wireless receiver may include a receiver body encompassing one or more antenna elements, a cover removably coupled to the receiver body, and a mounting bracket removably coupled to the receiver body. In such implementations, at least one of the one or more antenna elements, the cover, or the mounting bracket may be movable with respect to the receiver body in order to align the antenna of the wireless receiver with a signal path to a RAN device. For example, the cover and/or the mounting bracket may be reversible with respect to the receiver body such that the wireless receiver may be mounted to a surface with a signal-facing surface thereof facing either toward the surface or away from the surface in order to establish a wireless connection with a RAN device or a similar RF entity. For example, when the wireless receiver is mounted inside a building, the cover and/or the mounting bracket may be selectively installed with respect to the receiver body such that the wireless receiver may be mounted with a signal-facing surface thereof facing out a window, toward a RAN device or a similar RF entity. And when the wireless receiver is mounted outside a building, such as on a side of a building, the cover and/or the mounting bracket may be selectively installed with respect to the receiver body such that the wireless receiver may be mounted with a signal-facing surface thereof facing away from the building, toward a RAN device or a similar RF entity. Additionally, or alternatively, the one or more antenna elements may be pivotable with respect to the mounted receiver body in order to align the antenna elements with a signal path of the RAN device and thereby achieve a strong connection with a RAN device or a similar RF entity. As a result, the wireless receiver may be capable of establishing a robust connection with a RAN device or similar RF entity, resulting in reduced communication errors and thus reduced power, computing, and communication resource consumption that would otherwise be required for correcting communication errors; increased bandwidth and reduced latency with respect to the client device communications; and otherwise more efficient usage of network resources.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2B:
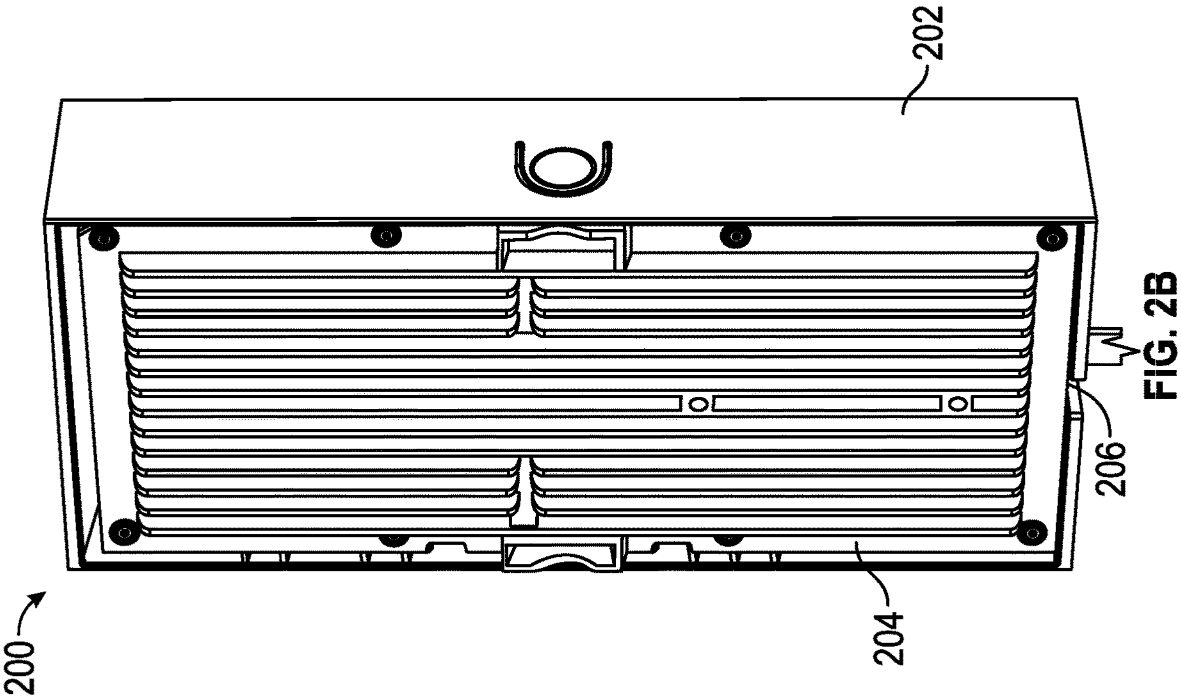
FIGS. 2A-2R are diagrams of an example wireless receiver associated with multiple antenna configurations.
Figure 2A:
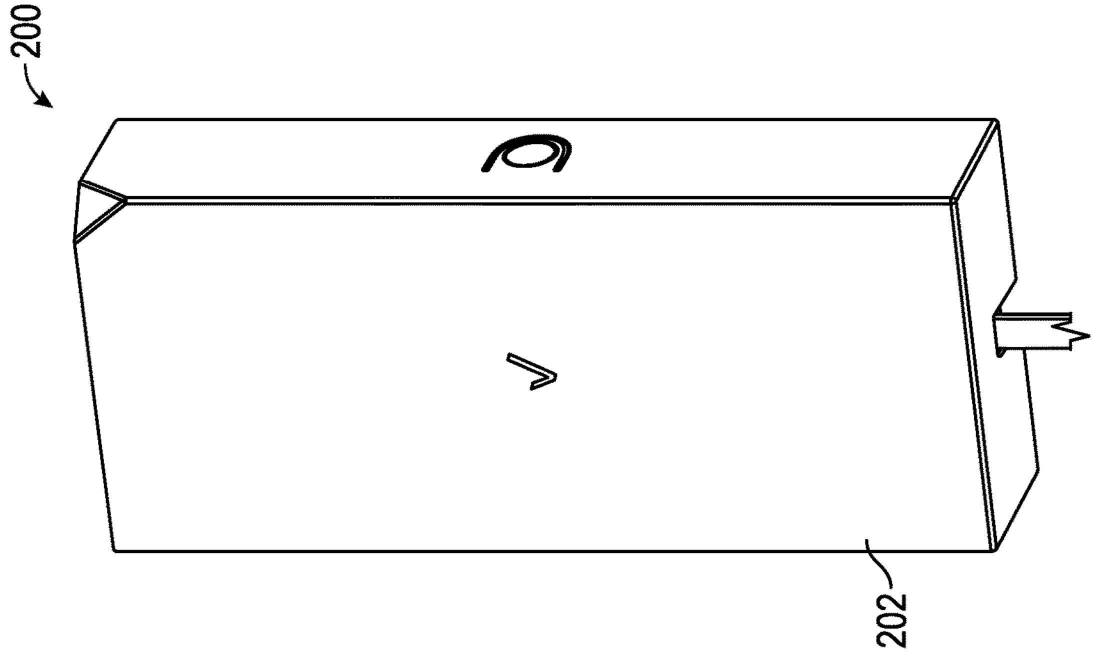
Figure 2D:
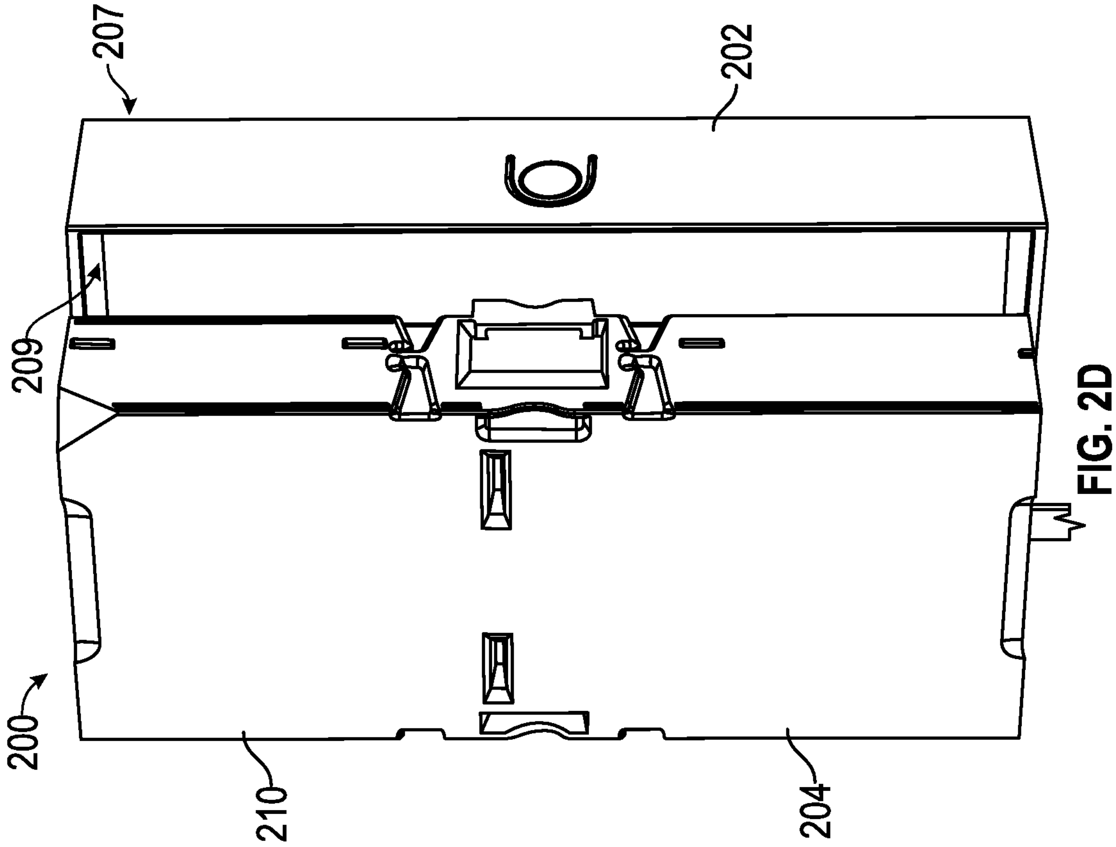
Figure 2C:
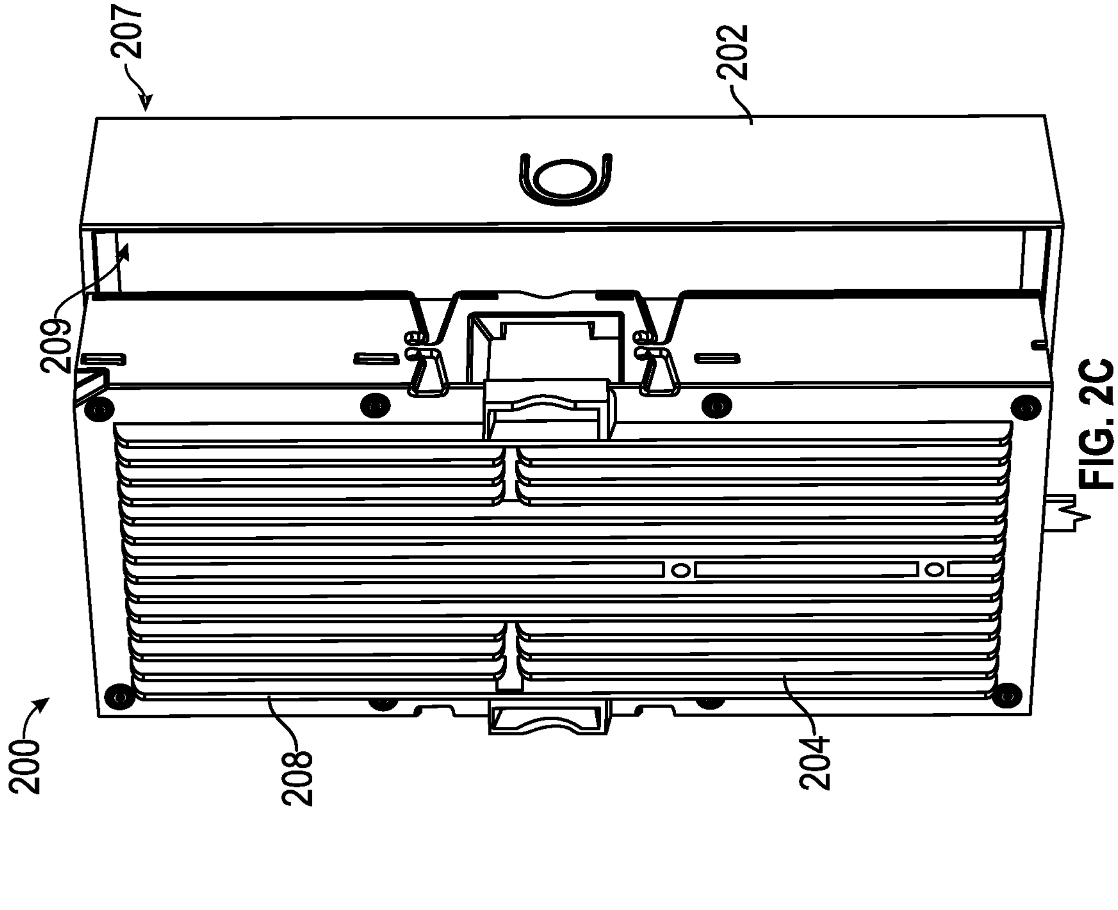
Figure 2E:
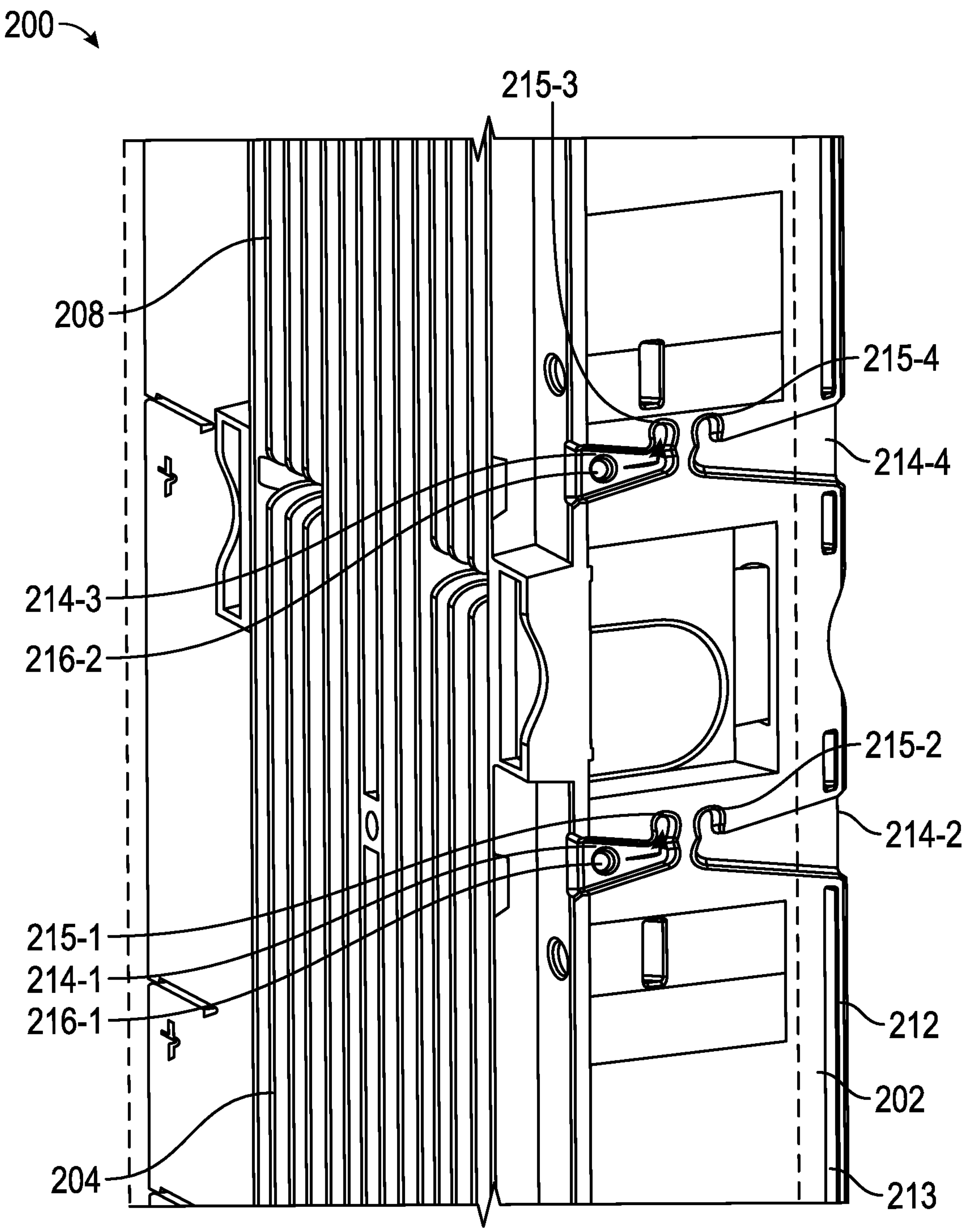
Figure 2G:
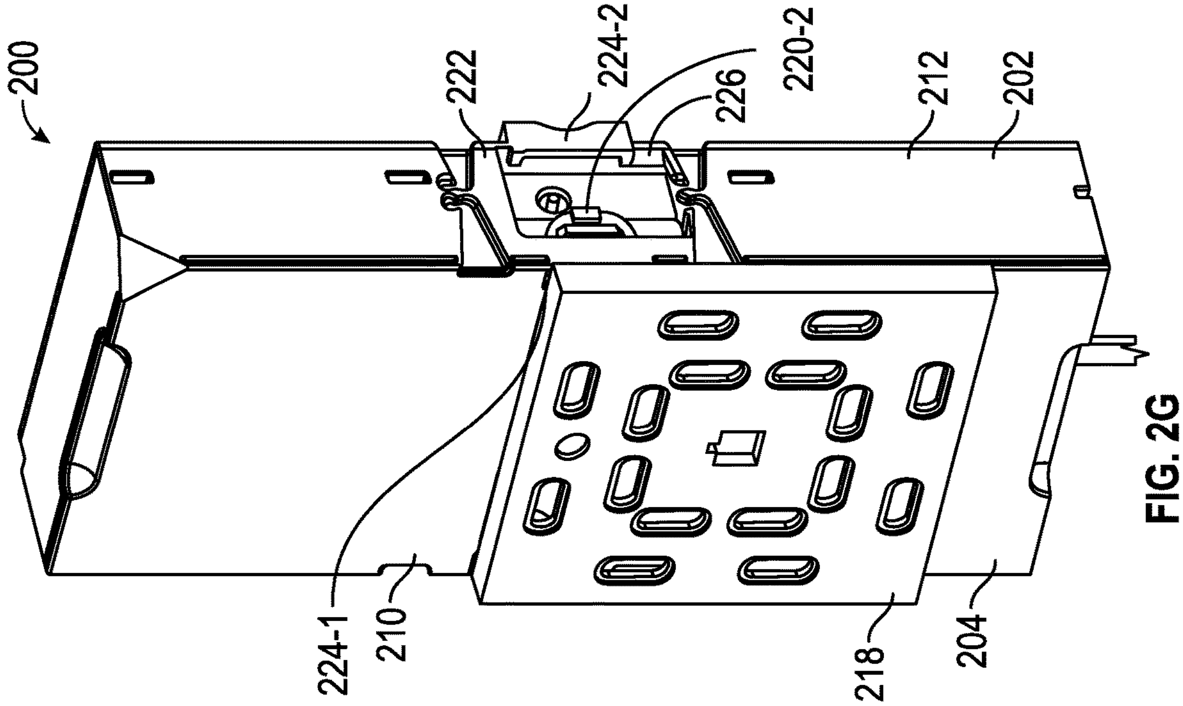
Figure 2F:
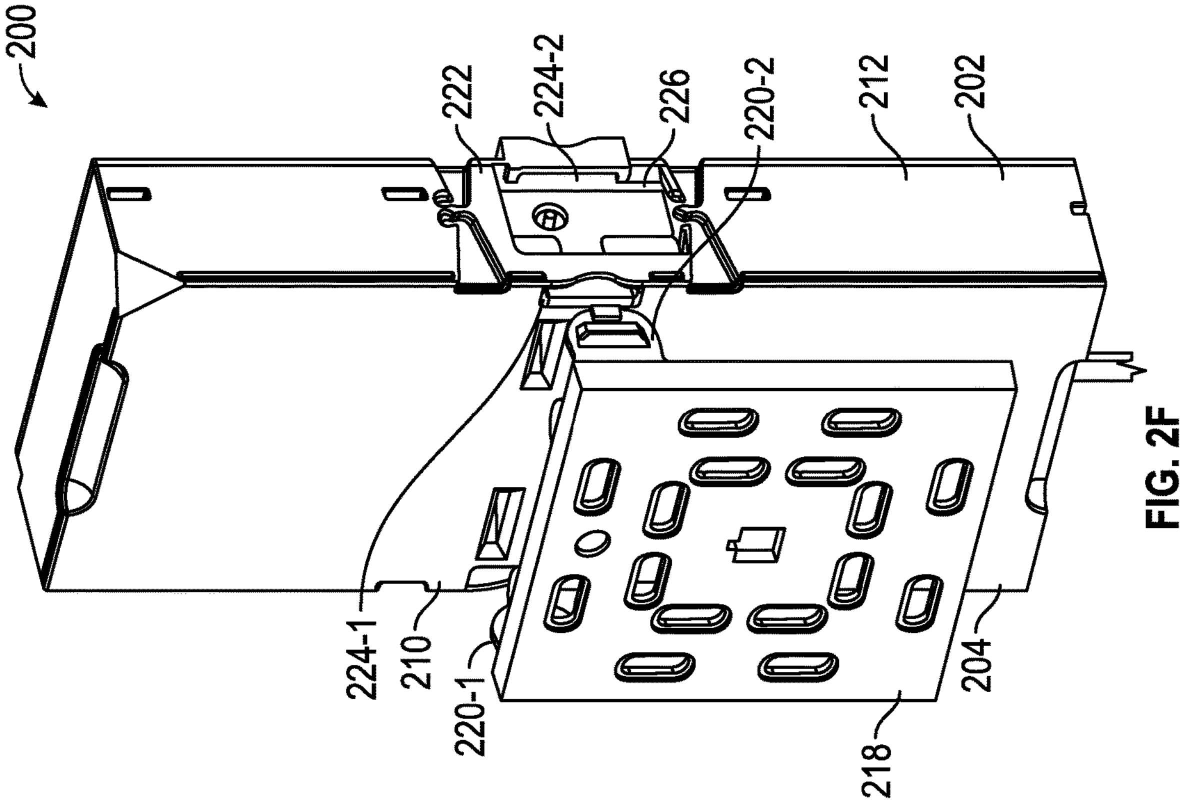
Figure 2H:
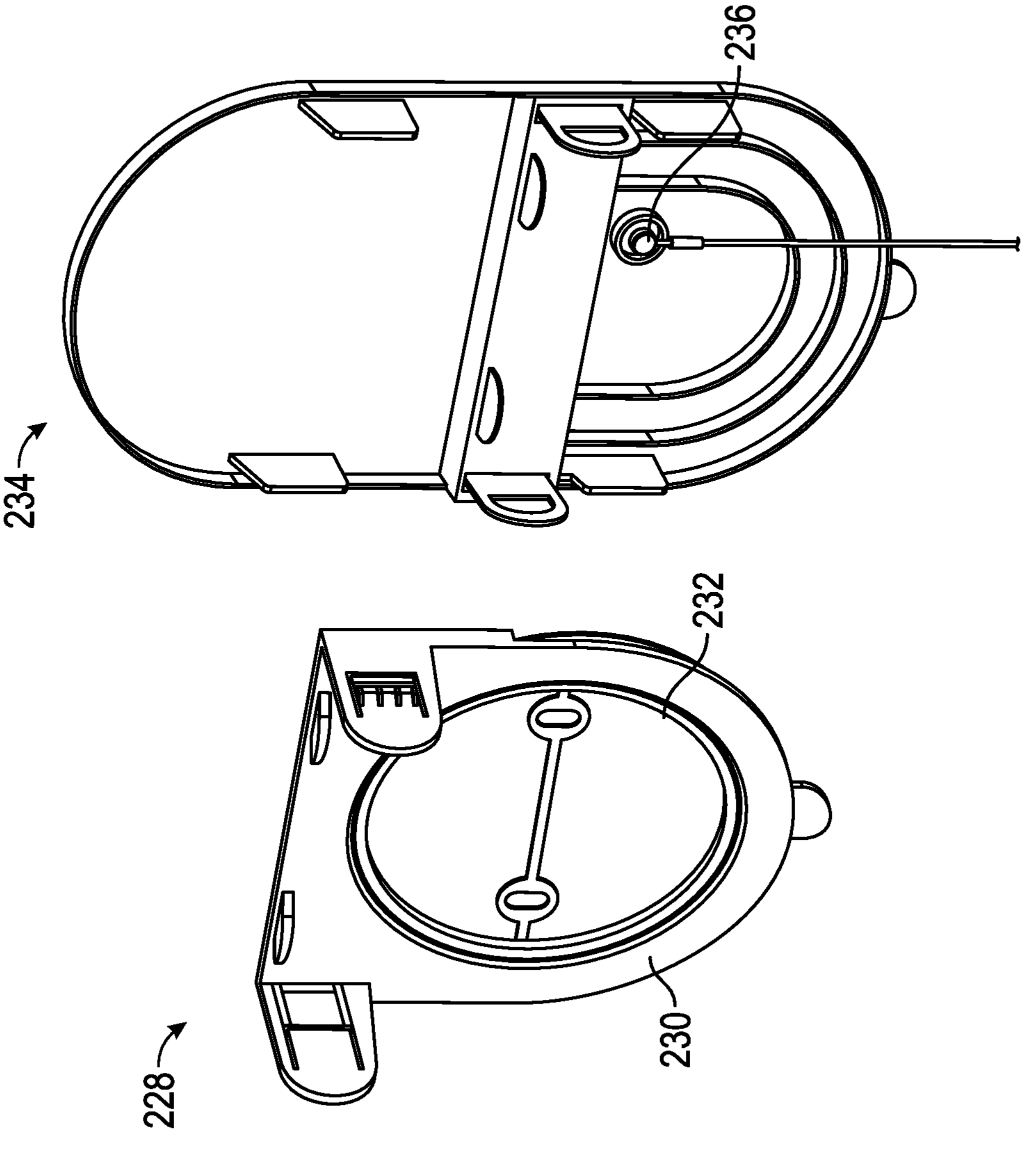
Figure 2I:
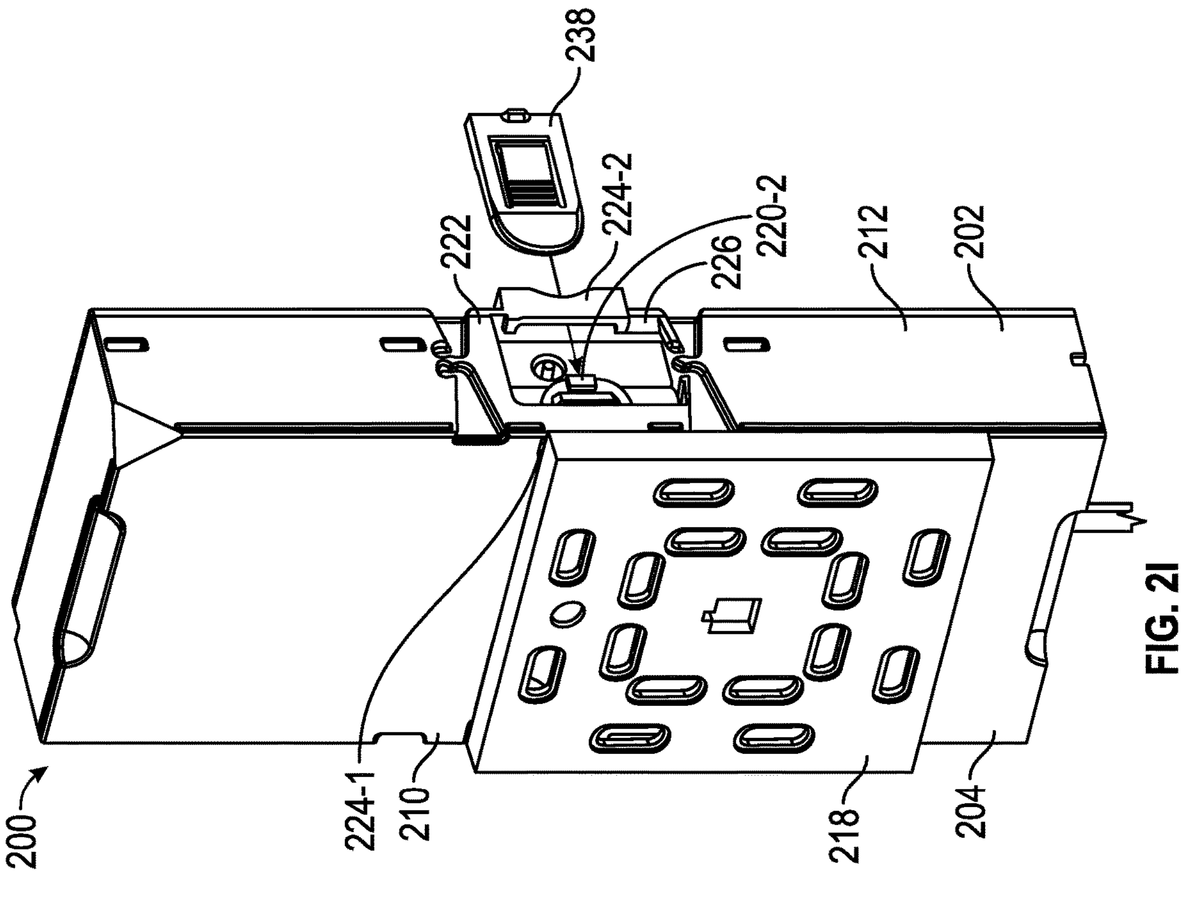
Figure 2J:
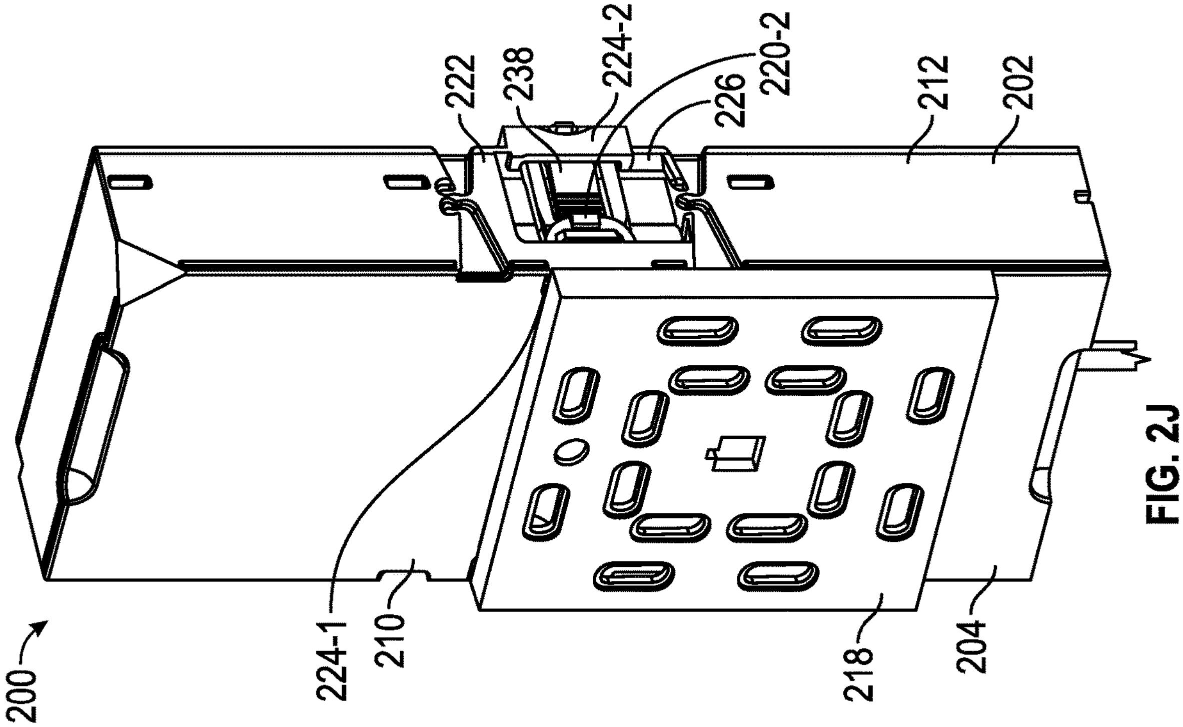
Figure 2L:
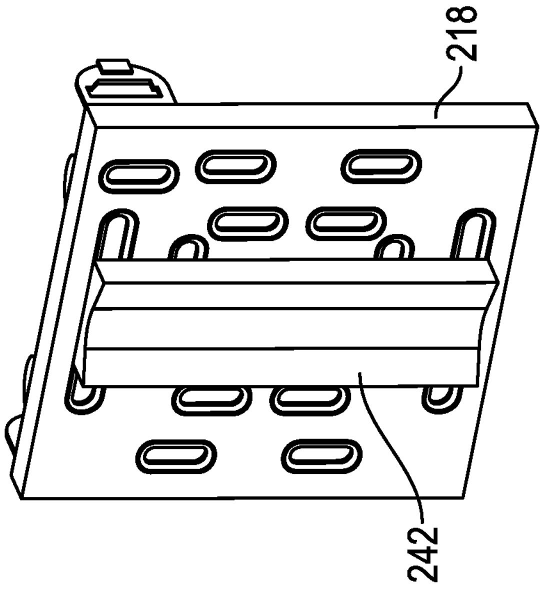
Figure 2M:
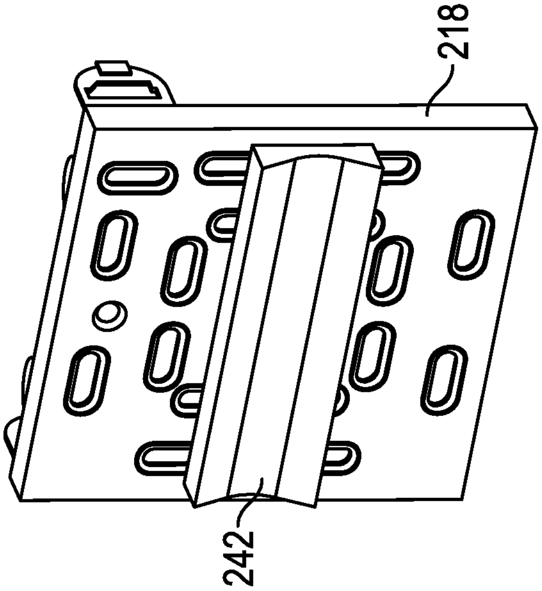
Figure 2K:
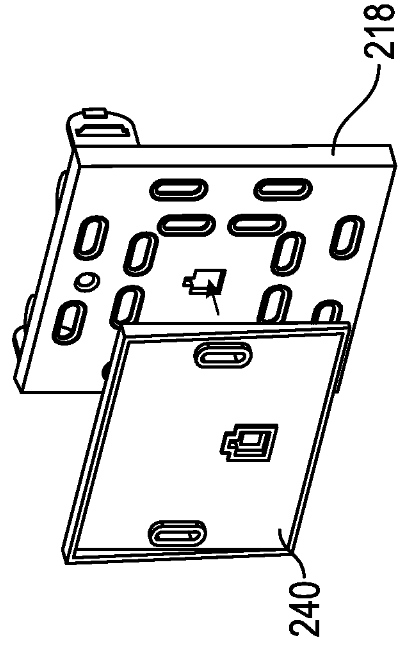
Figure 2O:
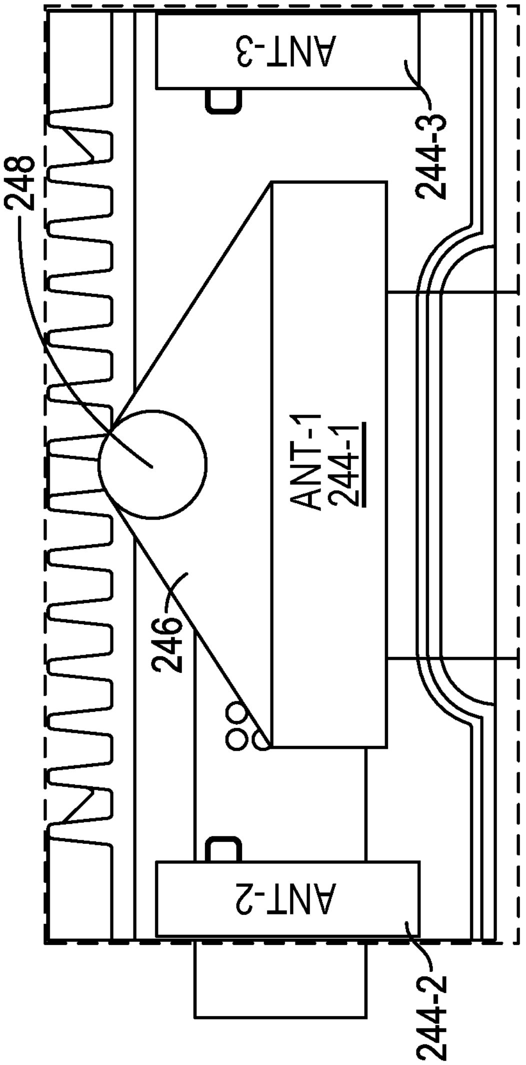
Figure 2N:
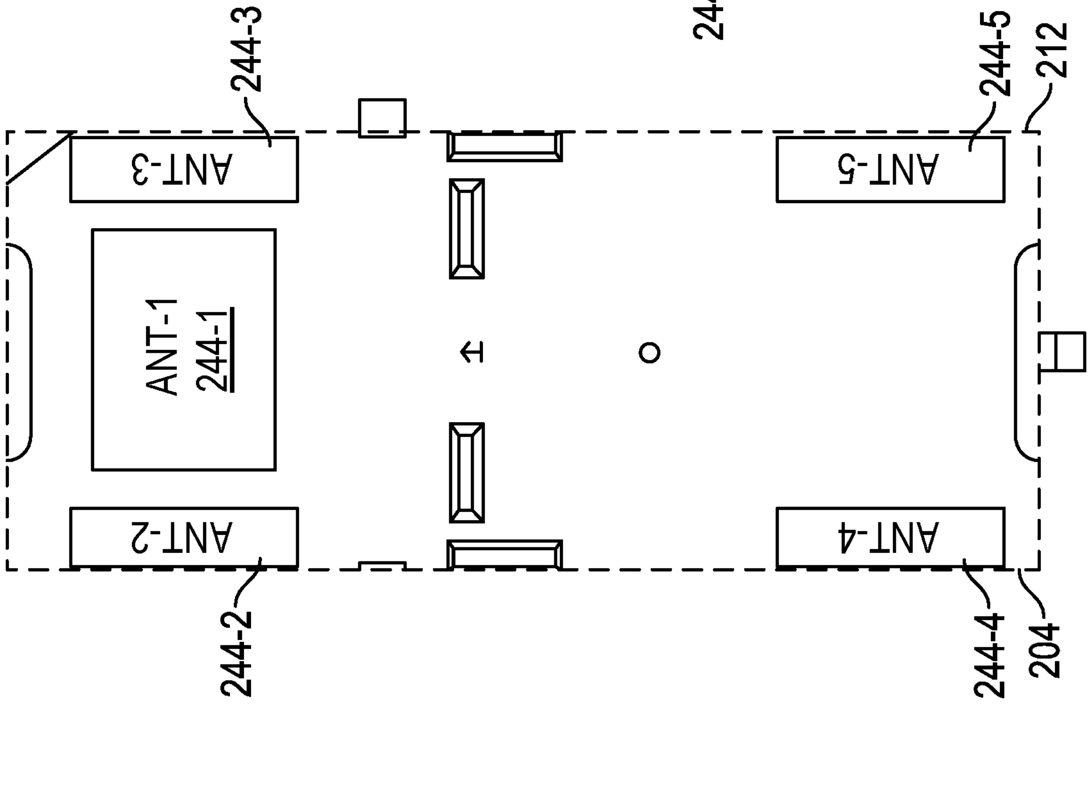
Figure 2P:
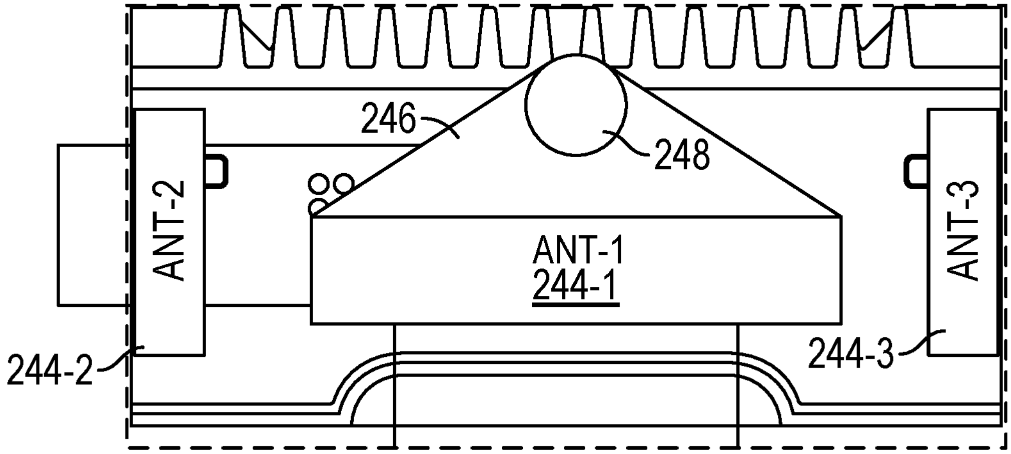
Figure 2Q:
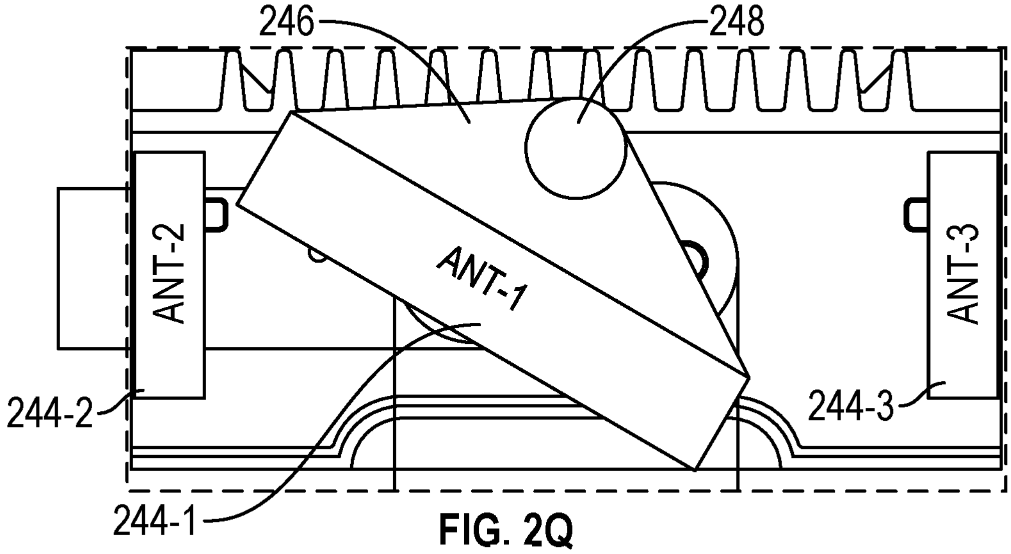
Figure 2R:
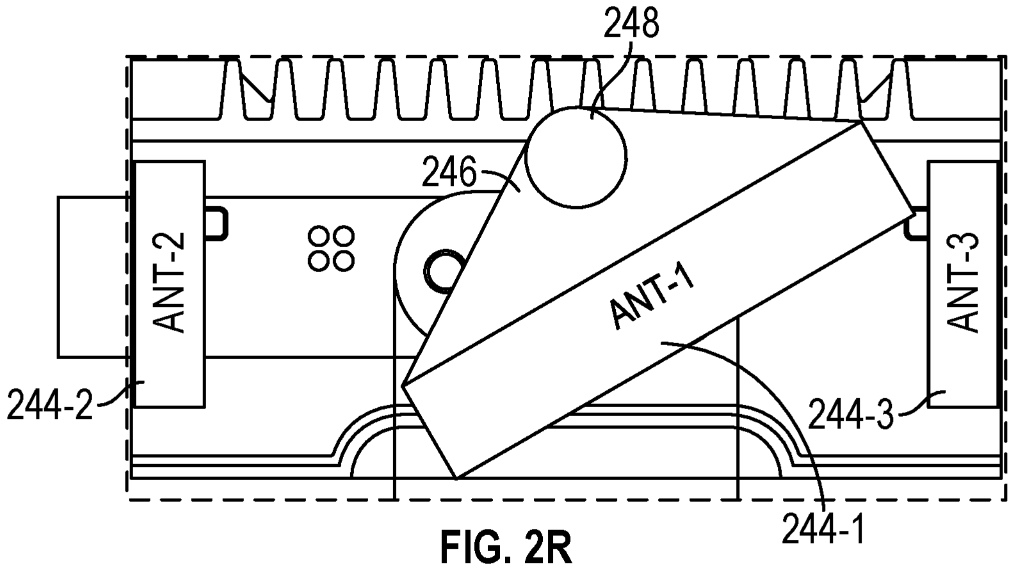

FIGS. 2A-2R are diagrams of an example wireless receiver 200 associated with multiple antenna configurations. In some implementations, the wireless receiver 200 may be configured to provide Internet connectivity or similar data network connectivity to one or more client devices (e.g., via a router 107 or a similar device), such as one or more of the client devices 106-1 through 106-4 described above in connection with FIG. 1. For example, the wireless receiver 200 may be configured to provide Internet connectivity via communication with a RAN device (e.g., RAN device 102) of a wireless communication network (e.g., a cellular network, a fourth generation (4G) or long term evolution (LTE) network, a fifth generation (5G) or new radio (NR) network, or the like), or a similar RF entity.

As shown by FIGS. 2A and 2B, the wireless receiver 200 may include a reversible cover 202 at least partially surrounding a receiver body 204. The reversible cover 202 may be removably couplable to the receiver body 204 such that the reversible cover 202 may be installed in one of multiple installation configurations in order to support one of multiple antenna configurations, which is described in more detail below in connection with FIGS. 2C-2E. In some implementations, the receiver body 204 may include one or more electronic components within an interior of the receiver body 204, such as for purposes of establishing a wireless connection with a RAN device (e.g., RAN device 102) or a similar RF entity, establishing a wireless connection with one or more client devices (e.g., client devices 106 via the router 107), and/or a similar purpose. For example, the receiver body 204 may internally house one or more antenna elements (described in more detail in connection with FIGS. 2N-2R below), one or more of the hardware components described below in connection with FIG. 4, or similar components.

In some implementations, the receiver body 204 may include an Ethernet port 206 or a similar port for receiving a data cable and/or a power cable, such as an Ethernet cable or similar cable. More particularly, the receiver body 204 may include an Ethernet port 206 or similar port configured to supply power to the one or more antenna elements and/or other electronic components within the receiver body 204. In such implementations, the wireless receiver 200 may be powered by an Ethernet connection or similar connection, thereby eliminating the need for using a separate power cord for powering the wireless receiver 200. This may increase an installation versatility of the wireless receiver 200, such as by enabling outdoor installations. More particularly, an Ethernet cable or similar cable may be a crushable cable that may be configured to be crushed by a window within a window frame or similar building component when mounting the wireless receiver 200 outside of a building.

As best seen in FIGS. 2C-2D, the reversible cover 202 may include a closed end 207 and an opposing open end 209. The open end 209 may be configured to removably receive the receiver body 204 therein. Moreover, in some implementations, the reversible cover 202 may be movable between a first position and/or configuration, as shown in FIG. 2C, and a second position and/or configuration, as shown in FIG. 2D, such as for a purpose of altering an alignment of the wireless receiver 200 with respect to a signal path. More particularly, the receiver body 204 may include a heat-dissipation surface 208 and an opposing signal-facing surface 210. The heat-dissipation surface 208 of the receiver body 204 may include one or more heat sinks, ribs, or similar components configured to dissipate heat from the wireless receiver 200 during operation. The signal-facing surface 210 of the receiver body 204 may be a side of the wireless receiver 200 that is to face a RAN device (e.g., RAN device 102) or a similar RF entity during use of the wireless receiver 200 (e.g., the signal-facing surface 210 of the receiver body 204 may be oriented such that the signal-facing surface 210 faces towards an RF signal source during use of the wireless receiver 200). In this regard, one or more antenna components may be arranged within the receiver body 204 in such a way that one or more antenna elements are generally proximate to the receiver body 204 via the signal-facing surface 210 in order to receive and transmit signals during use of the wireless receiver 200 with minimal interference from other elements within the receiver body 204.

In such implementations, when the reversible cover 202 is in the first position (shown in FIG. 2B and, for ease of discussion, shown in a slightly exploded state in FIG. 2C such that the reversible cover 202 is partially removed from the receiver body 204), the reversible cover 202 may be coupled to the receiver body 204 such that the closed end 207 of the reversible cover 202 is disposed proximate to the signal-facing surface 210 of the receiver body 204 and such that the open end 209 of the reversible cover 202 is disposed proximate to the heat-dissipation surface 208 of the receiver body 204. Such a configuration may be used when, for example, the wireless receiver is installed outside, such as on the side of a building. In such scenarios, the placing the reversible cover 202 in the configuration shown in FIGS. 2B and 2C may enable mounting of the wireless receiver 200 against the building with the heat-dissipation surface 208 facing the building and with the signal-facing surface 210 facing away from the building, enabling the signal-facing surface 210 to generally face a RAN device or a similar RF entity (which is described in more detail below in connection with the discussion of the various mounting brackets shown in FIGS. 2F-2M).

Moreover, when the reversible cover 202 is in the second position (which, for ease of discussion, is shown in a slightly exploded state in FIG. 2D such that the reversible cover 202 is partially removed from the receiver body 204), the reversible cover 202 may be coupled to the receiver body 204 such that the closed end 207 of the reversible cover 202 is disposed proximate to the heat-dissipation surface 208 of the receiver body 204 and such that the open end 209 of the reversible cover 202 is disposed proximate to the signal-facing surface 210 of the receiver body 204. Such a configuration may be used when, for example, the wireless receiver 200 is installed inside, such as on an interior surface of a window of a building. In such scenarios, placing the reversible cover 202 in the configuration shown in FIG. 2C may enable mounting of the wireless receiver 200 against the window with the signal-facing surface 210 facing the glass and thus away from the interior of the building, enabling the signal-facing surface 210 to generally face a RAN device or a similar RF entity (which is described in more detail below in connection with the discussion of the various mounting brackets shown in FIGS. 2F-2M). In this regard, the reversible cover 202 may be movable between the first configuration (e.g., as shown in FIG. 2C) and the second configuration (e.g., as shown in FIG. 2D) for a purpose of altering the signal path of the wireless receiver 200 (e.g., a path through which an RF signal enters the wireless receiver 200 and/or the receiver body 204), which is described in more detail below.

As shown in FIG. 2E, the reversible cover 202 and/or the receiver body 204 may include one or more features and/or components to enable mounting of the reversible cover 202 in multiple positions and/or configurations, such as in the first configuration and the second configuration described above in connection with FIGS. 2C and 2D. More particularly, the receiver body 204 may include a generally hollow outer casing 212 encompassing the various electronic components therein. The outer casing 212 may include one or more integrally formed features enabling multiple mounting configurations of the reversible cover 202. For example, the outer casing 212 may include multiple grooves 214 on side surfaces 213 of the receiver body, shown as groove 214-1 through groove 214-4 in FIG. 2E. Each groove 214 may include a generally tapered profile extending along the side surface 213 such that a widest portion of the groove 214 is disposed near an outer surface of the receiver body 204 (e.g., one of the heat-dissipation surface 208 or the signal-facing surface 210 of the receiver body 204), and such that a width of the groove 214 decreases along a direction extending from a respective outer surface of the receiver body 204 towards a center of the side surface 213 of the receiver body 204. For ease of discussion, a direction extending along the side surface 213 from a widest portion of a groove 214 toward a narrowest portion of the groove 214 is referred to herein as a horizontal direction, and a direction extending along the side surface 213 substantially perpendicular to the horizontal direction is referred to herein as a vertical direction.

Moreover, the outer casing 212 may include multiple detents 215 on the side surfaces 213 of the receiver body 204, shown as detent 215-1 through detent 215-4 in FIG. 2E. Each detent 215 may be integrally formed with a corresponding groove 214 (e.g., at an upper end (in the vertical direction) of the groove 214 as shown in FIG. 2E, or at a different location in other implementations) and/or near a center of the side surface 213 (e.g., proximate to a narrowest portion of the groove 214 in the example shown in FIG. 2E). In such implementations, the reversible cover 202 may include one or more protrusions 216, shown in FIG. 2E as protrusion 216-1 and protrusion 216-2. In the example shown in FIG. 2E, the protrusions 216 may be substantially circular in cross-section and/or may be substantially pillar-shaped, extending inward from an interior surface of the reversible cover 202. The detents 215 and/or the protrusions 216 may be sized and shaped such that, when the reversible cover 202 is removably coupled to the receiver body 204, a detent 215 is configured to receive a corresponding protrusion 216 in a clearance fit, obstructing movement of the reversible cover 202 with respect to the receiver body 204.

More particularly, when installing the reversible cover 202 in the first configuration (e.g., a configuration in which the closed end 207 of the reversible cover 202 is disposed proximate to the signal-facing surface 210 of the receiver body 204 and such that the open end 209 of the reversible cover 202 is disposed proximate to the heat-dissipation surface 208 of the receiver body 204, as shown in FIG. 2C in an exploded view), one or more protrusions 216 on the reversible cover 202 may be aligned with the second groove 214-2 and/or the fourth groove 214-4. The reversible cover 202 may be moved in a generally horizontal direction (e.g., generally to the left in the view shown in FIG. 2E) such that the protrusions follow the contour of the grooves 214-2, 214-4 until reaching a portion of the grooves 214-2, 214-4 near the corresponding detents 215-2, 215-4 (e.g., a proximal end of the corresponding groove 214-2, 214-4, as depicted in FIG. 2E, or a different portion of the corresponding groove 214-2, 214-4 in other implementations). The reversible cover 202 may then be moved in a vertical direction (e.g., generally upward in the view shown in FIG. 2E) until the protrusions 216 are received in a clearance fit in the corresponding detents 215-2, 215-4, securing the reversible cover 202 in the first configuration.

Similarly, when installing the reversible cover 202 in the second configuration (e.g., a configuration in which the closed end 207 of the reversible cover 202 is disposed proximate to the heat-dissipation surface 208 of the receiver body 204 and such that the open end 209 of the reversible cover 202 is disposed proximate to the signal-facing surface 210 of the receiver body 204, as shown in FIG. 2D in an exploded view and as shown in FIG. 2E), the first protrusion 216-1 and the second protrusion 216-2 on the reversible cover 202 may be aligned with the first groove 214-1 and the third groove 214-3, respectively. The reversible cover 202 may be moved in a generally horizontal direction (e.g., generally to the right in the view shown in FIG. 2E) such that the protrusions 216-1, 216-2 follow the contour of the grooves 214-1, 214-3 until reaching a portion of the grooves 214-1, 214-3 near the corresponding detents 215-1, 215-3 (e.g., a proximal end of the corresponding groove 214-1, 214-1, as depicted in FIG. 2E, or a different portion of the corresponding groove 214-2, 214-4 in other implementations). The reversible cover 202 may then be moved in a vertical direction (e.g., generally upward in the view shown in FIG. 2E) until the protrusions 216-1, 216-2 are received in a clearance fit in the corresponding detents 215-1, 215-3, securing the reversible cover 202 in the second configuration.

In some implementations, a location of a detent 215 with respect to a groove 214 may be a location where a corresponding protrusion 216 is located when the reversible cover 202 is fully installed in a horizontal direction. In this regard, when sliding on the reversible cover 202 in the horizontal direction, an inside surface of the reversible cover 202 may contact the receiver body 204 (e.g., the signal-facing surface 210, when installed in the first configuration, or the heat-dissipation surface 208, when installed in the second configuration), thereby restricting further horizontal movement of the reversible cover 202 and aligning one or more protrusions 216 within one or more corresponding detents 215. The reversible cover 202 may then be moved in the vertical direction (e.g., upward) such that the protrusions 216 are received in a clearance fit in the corresponding detents 215, securing the reversible cover 202 in the first configuration or the second configuration.

To remove the reversible cover 202, such as for a purpose of switching between the first configuration and the second configuration, the above described steps may generally be performed in reverse. Namely, the reversible cover 202 may be moved downward, in the vertical direction to unseat the protrusions 216 from corresponding detents 215, and the reversible cover 202 may then be moved horizontally (e.g., with the protrusions 216 generally following the contour of corresponding grooves 214) until the reversible cover 202 is fully removed from the receiver body 204. In this way, the reversible cover 202 may selectively be installed in one of multiple configurations (e.g., one of the first configuration shown in FIG. 2C or the second configuration shown in FIG. 2D), such as for a purpose of aligning the signal-facing surface 210 of the receiver body 204 with a RAN device (e.g., RAN device 102) or similar RF entity. For example, the reversible cover 202 may be installed in the first configuration when the wireless receiver 200 is installed outside, such that the heat-dissipation surface 208 may be mounted proximate a building wall or the like and such that the signal-facing surface 210 (with the closed end 207 of the reversible cover 202 disposed proximate thereto) may face away from the building, towards an RF source (e.g., a RAN device). Alternatively, the reversible cover 202 may be installed in the second configuration when installed inside, such that the signal-facing surface 210 may be mounted proximate a window or the like, facing toward an RF source (e.g., a RAN device), and such that the heat-dissipation surface 208 (with the closed end 207 of the reversible cover 202 disposed proximate thereto) may face away from the window, towards an interior of the building.

In some implementations, a surface of the receiver body 204 that is not covered by the closed end 207 of the reversible cover 202 may be mounted to a surface or other object using a tape, a hook and loop fastener, or a similar mounting material. Additionally, or alternatively, the wireless receiver 200 may be mounted to a surface or object via a mounting bracket, such as the mounting bracket 218 shown in FIGS. 2F and 2G. In such implementations, the wireless receiver 200 (more particularly, the receiver body 204 of the wireless receiver 200) may include one or more features configured to receive the mounting bracket 218 in multiple configurations, such that the mounting bracket 218 may be movable with respect to the receiver body 204 in order to alter a signal path of the wireless receiver 200 (e.g., to facilitate generally aligning the signal-facing surface 210 of the receiver body 204 with a RAN device or a similar RF entity).

More particularly, as shown in FIG. 2F, the mounting bracket 218 may include a pair of mounting tabs 220, shown in FIG. 2F as a first mounting tab 220-1 and a second mounting tab 220-2. The mounting tabs 220 may be biased outwardly from the main body of the mounting bracket 218 in order to removably secure the mounting bracket 218 to the receiver body 204. More particularly, the receiver body 204 may include one or more housing brackets 222 integrally formed in the receiver body 204 (e.g., the receiver body 204 may include two housing brackets 222, one on each side surface 213 of the receiver body 204). Each housing bracket 222 may include multiple (e.g., two) channels 224, shown as a first channel 224-1 proximate to the signal-facing surface 210 and a second channel 224-2 proximate to the heat-dissipation surface 208. The mounting bracket 218 may thus be removably couplable to the receiver body 204, such as by compressing the mounting tabs 220 to generally align with respective channels 224, and inserting the mounting tabs into the channels 224 in the horizontal direction. The housing bracket 222 may further include an aperture 226 for receiving a mounting tab 220 when the mounting bracket 218 is fully installed, such as in the position shown in FIG. 2G. More particularly, the mounting tabs 220 may be biased outward from the receiver body 204 when the mounting bracket 218 is fully inserted and/or installed thereon, thereby removably securing the mounting tabs 220 on the receiver body 204, within corresponding apertures 226.

In this regard, the mounting bracket 218 may be received in multiple installation positions with respect to the receiver body 204. For example, when the reversible cover 202 is installed in the first configuration, as shown and described above in connection with FIG. 2C, the mounting bracket 218 may be removably coupled to the receiver body 204 such that the mounting bracket 218 is proximate to the heat-dissipation surface 208 of the receiver body 204. And when the reversible cover 202 is installed in the second configuration, as shown and described above in connection with FIG. 2D, the mounting bracket 218 may be removably coupled to the receiver body 204 such that the mounting bracket 218 is proximate the signal-facing surface 210 of the receiver body 204, as shown by FIG. 2G. In this regard, the mounting bracket 218 may be movable between multiple positions in order to selectively mount the wireless receiver 200 in one of multiple installation configurations, thereby altering a signal-receiving path of the wireless receiver 200 in order to maintain a robust connection with a RAN device or a similar RF entity. More particularly, the mounting bracket 218 may be movable between at least a first position, in which the mounting bracket 218 is coupled to the receiver body 204 such that the mounting bracket 218 is disposed proximate to a signal-facing surface 210 of the receiver body 204 (as shown in FIG. 2G), and a second position, in which the mounting bracket 218 is coupled to the receiver body 204 such that the mounting bracket 218 is disposed proximate to a heat-dissipation surface 208 of the receiver body 204.

Moreover, as shown in FIGS. 2F and 2G, the mounting bracket 218 may include numerous through-holes in order to mount the mounting bracket 218 to a surface in one of multiple mounting configurations. For example, the mounting bracket 218 may be fastened (e.g., screwed, nailed, zip-tied, or otherwise adhered to) a surface by extending one or more fasteners through one or more through-holes of the mounting bracket 218 and engaging the one or more fasteners with the surface. For example, when the mounting bracket 218 is used to mount the wireless receiver 200 outside of a building, the mounting bracket 218 may be screwed or nailed to a surface (e.g., a building wall, or a similar surface) via a screw or nail extending through a through-hole of the mounting bracket 218, or may be secured to a pole or a similar surface by extending a strap (e.g., a zip-tie) through a through-hole and around a pole or similar object. By including multiple through-holes in the mounting bracket 218, the wireless receiver 200 may be installed in one of multiple orientations and/or configurations in order to maintain a robust wireless connection with a RAN device or a similar RF entity.

In some implementations, such as the example shown in FIG. 2F, the through-holes in the mounting bracket 218 may be symmetrically arranged about a vertical centerline of the mounting bracket 218 and/or a horizontal centerline of the mounting bracket 218. This symmetrical arrangement may permit use of multiple fasteners (e.g., multiple zip-ties, screws, or similar fasteners) for installation, with at least one fastener being provided in each vertical half and/or each horizontal half of the mounting bracket 218, such as for a purpose of increasing stability of an installation of the wireless receiver 200. Additionally, or alternatively, the mounting bracket 218 may include multiple sets of through-holes, such as an inner set of through-holes (e.g., a set of through holes located nearest a center of the mounting bracket 218) and an outer set of through-holes (e.g., a set of through holes located farther outward from a center of the mounting bracket 218 than the inner set of through holes), which may enable installation in various scenarios. For example, the inner set of through holes may be used to mount the wireless receiver 200 to relatively small and/or thin poles, rails, or similar structures, while the outer set of through holes may be used to mount the wireless receiver 200 to relatively large and/or thick poles, rails, or similar structures.

In some other implementations, other types of mounting brackets may be used to mount the wireless receiver 200 to a surface. For example, FIG. 2H shows other example mounting brackets that may be used to mount the wireless receiver 200 to a surface in order to maintain a robust connection with a RAN device or a similar RF entity. For example, FIG. 2H shows a mounting bracket 228 that may be used to mount the wireless receiver 200 within a building, such as on an inside surface of a window or a similar surface and/or via an interior wall (e.g., by extending one or more fasteners through one or more through holes provided in a central portion of the mounting bracket 228). For example, in implementations in which the mounting bracket 228 may be used to mount the wireless receiver 200 on an inside surface of a window or a similar surface, the mounting bracket 228 may include an adhesive side (e.g., a side facing away from the view shown in FIG. 2H, which may include tape or a similar material, such as Gecko tape or a similar mounting material) used to removably adhere the mounting bracket 228 (and thus a wireless receiver 200 removably coupled thereto) to a window or a similar surface. The mounting bracket 228 may further include a rotating mechanism, such that, when removably coupled to the mounting bracket 228, that the receiver body 204 is rotatable with respect to a portion of the mounting bracket 228. This may enable the wireless receiver 200 to rotate about a portion of the mounting bracket 228 after being mounted to a surface, such as for a purpose of assisting an end user with aligning and/or straightening the wireless receiver 200 after installation. For example, as shown in FIG. 2H, the mounting bracket 228 may include a collar 230 surrounding, and rotatably mounted with respect to, a mounting component 232. In this regard, the mounting bracket 228, and, more particularly, the mounting component 232 thereof, may be adhered to a surface (e.g., a window), and the collar 230 may be removably coupled to the receiver body 204 via a pair of mounting tabs (e.g., in a similar manner as described above in connection with the mounting bracket 218 in FIGS. 2F and 2G). Accordingly, the receiver body 204 may be rotated with respect to the mounting component 232 after installation, such as for a purpose of optimizing a wireless connection between the receiver body 204 and a RAN device or a similar RF entity.

As also shown in FIG. 2H, another mounting bracket 234 may be used to mount the wireless receiver 200 to a surface, such as an outward facing window surface. In that regard, the mounting bracket 234 may include an adhesive side (e.g., a side facing away from the view shown in FIG. 2H, which may include tape or a similar material, such as Gecko tape or a similar mounting material) used to removably adhere the mounting bracket 234 (and thus a wireless receiver 200 removably coupled thereto) to a window or similar surface. In this implementation, the mounting bracket 234 may further include a tether attachment 236. The tether attachment 236 may be used to secure a distal end of a tether to the mounting bracket 234, with a proximal end of the tether being secured to a building wall or a similar surface. In some other implementations, the tether may be mounted to an interior surface of a building, such as by passing a proximal end of the tether through a window opening (e.g., between a windowsill and a bottom edge of a window) or other opening in the building and affixing the proximal end to the interior surface of the building (e.g., an interior wall or other surface). In this regard, if the wireless receiver 200 comes dislodged from the surface (e.g., if a tape side of the of the mounting bracket 234 comes unfastened from a window) the wireless receiver 200 may remain tethered to a building, preventing a fall thereof.

In some implementations, a mounting bracket 218, 228, 234 may include additional components or mechanisms in order to secure the wireless receiver 200 in a mounting orientation, such as for a purpose of maintaining an optimal connection with a RAN device or a similar RF entity. For example, as shown in FIGS. 21 and 2J, in some implementations, the wireless receiver 200 may include a shim 238. As been seen in FIG. 2J, the shim 238 may be removably received in an opposite channel 224 of the housing bracket 222 than a channel 224 used to receive a mounting tab 220 of the mounting bracket 218 or other mounting bracket (e.g., mounting bracket 228, 234). The shim 238, when removably received in the housing bracket 222 in this manner, may obstruct compression of the mounting tabs 220 of the installed mounting bracket 218, and/or may obstruct removal of the mounting bracket 218. In this regard, the wireless receiver 200 may be essentially locked into an installed position and/or configuration, thereby preventing removal of the wireless receiver 200. As a result, the shim 238 may ensure that, once the wireless receiver 200 in installed in an optimal RF configuration, the wireless receiver 200 is not easily movable by an end-user, thereby maintaining a robust connection with a RAN device or other RF entity, and/or the shim 238 may deter theft of the wireless receiver 200 by reducing an ease by which the wireless receiver 200 may be removed from a mounting bracket (e.g., mounting bracket 218 or a similar mounting bracket).

As shown in FIG. 2K, in some implementations, a mounting bracket (e.g., mounting bracket 218 or a similar mounting bracket, such as mounting bracket 228, 234) may be associated with a wedge mechanism 240. The wedge mechanism 240 may enable mounting the receiver body 204 at an angle with respect to a mounting surface, such that the receiver body 204 is tiltable with respect to the mounting surface via the wedge mechanism. More particularly, the wedge mechanism 240 may include a substantially triangular cross-sectional area such that, when included between the mounting bracket 218 and a surface, the mounting bracket 218 (and thus a receiver body 204 removably coupled thereto) may be mounted at an angle with respect to the surface. In some implementations, multiple wedge mechanisms 240 may be stackable such that, when the multiple wedge mechanisms 240 are included between a mounting bracket 218 and a surface, the mounting bracket 218 (and thus a receiver body 204 removably coupled thereto) may be mounted at a larger angle with respect to the surface than when only using a single wedge mechanism 240. In this regard, the wedge mechanism 240 may be used to mount the wireless receiver 200 to an inclined surface (e.g., vinyl siding or the like) and/or in order to mount the wireless receiver 200 at an angle with respect to a building, such as for a purpose of aligning the signal-facing surface 210 of the receiver body 204 with a RAN device or a similar RF entity, thereby establishing a robust wireless connection between the wireless receiver 200 and the RAN device or a similar RF entity.

As shown in FIGS. 2L and 2M, in some implementations, a mounting bracket (e.g., mounting bracket 218 or a similar mounting bracket, such as mounting bracket 228, 234) may be associated with a pole adapter 242. The pole adapter 242 may include a curved and/or faceted surface such that, when included between the mounting bracket 218 and a pole, rail, or similar surface, the mounting bracket 218 (and thus a receiver body 204 removably coupled thereto) may be securely mounted to the pole and/or may be obstructed from rotating with respect to the curved surface of the pole, rail, or similar surface. In this regard, the pole adapter 242 may be used to mount the wireless receiver 200 to a curved surface (e.g., a pole or the like) while maintaining the signal-facing surface 210 of the receiver body 204 in alignment with a RAN device or similar RF entity (e.g., in the presence of high winds or other external forces that may otherwise cause the wireless receiver 200 to rotate about the pole), thereby establishing a robust wireless connection between the wireless receiver 200 and the RAN device or similar RF entity.

In some implementations, the wireless receiver 200 may include one or more antenna elements that are movable with respect to the receiver body 204 in order to align the elements with a signal path between the wireless receiver 200 and a RAN device and thus establish a robust wireless connection with a RAN device or a similar RF entity. For example, as shown in FIG. 2N, the wireless receiver 200 may include multiple antenna elements 244, shown as a first antenna element 244-1 (e.g., "ANT-1"), a second antenna element 244-2 (e.g., "ANT-2"), a third antenna element 244-3 (e.g., "ANT-3"), a fourth antenna element 244-4 (e.g., "ANT-4"), and a fifth first antenna element 244-5 (e.g., "ANT-5"). In some implementations, the one or more antenna elements may be configured to communicate with multiple radio access technologies (RATs) and/or frequency bands, thereby improving wireless communication capabilities of the wireless receiver 200 as compared to wireless receivers that include an antenna element associated with a single RAT. For example, the multiple antenna elements 244 may include one antenna element that is associated with an LTE frequency band, another antenna element that is associated with a C-band frequency band, and another antenna element associated with a millimeter wave (mmWave) frequency band, among other examples. In this regard, the wireless receiver 200 may sometimes be referred to as a "tri-band" wireless receiver.

More particularly, in some implementations, the first antenna element 244-1 may be associated with a 5G/NR antenna, such as an antenna associated with frequency range 2 (FR2) and/or n260/n261 frequency bands (e.g., mmWave bands). The second antenna element 244-2 and/or the third antenna element 244-3 may be associated with an LTE/5GNR antenna, such as an antenna associated with frequency band 1 (FR1) and/or an antenna associated with a full-band reception capability and a C-band transmission capability. And the fourth antenna element 244-4 and/or the fifth antenna element 244-5 may be associated with an LTE/5GNR antenna, such as an antenna associated with FR1 and/or an antenna associated with a full-band reception capability and a full-band transmission capability.

In some implementations, one or more of the antenna elements 244 may be movable with respect to the receiver body 204, such as for a purpose of establishing an optimal wireless connection with a RAN device or a similar RF entity. For example, as shown in FIG. 2O, the first antenna element 244-1 may include a pivot mechanism 246, such that the first antenna element 244-1 is pivotable, with respect to the receiver body 204, about an axis 248. In some implementations, the pivot mechanism 246 may be a servo motor or similar electronic device configured to pivot the first antenna element 244-1 about the axis 248. In some implementations, the first antenna element 244-1 may be configured to rotate about the axis 248, via the pivot mechanism 246, after the wireless receiver 200 is powered up, such as for a purpose of discovering a position associated with a strongest RF signal reception among various antenna element positions.

More particularly, FIGS. 2P-2R show three different positions of the first antenna element 244-1. In some implementations, the first antenna element 244-1 may be configured to automatically rotate about the axis 248, via the pivot mechanism 246, upon the wireless receiver 200 being powered up, such as to one of the three positions shown in FIGS. 2P-2R and intermittent positions therebetween. While changing positions, the first antenna element 244-1 may perform various signal measurements, such as measurements of signals associated with a mmWave frequency band originating from a RAN device or a similar RF entity. The first antenna element 244-1 may further be configured to operate in a position (e.g., one of the three positions shown in FIGS. 2P-2R, or an intermediate position therebetween) in which a strongest measurement is detected. In this way, the one or more movable antenna elements 244 may be configured to improve a signal receiving path of the wireless receiver 200, such as when the wireless receiver 200 is mounted in a less than optimal alignment with respect to a RAN device or similar RF entity.

Based on the wireless receiver 200 having a capability of operating in multiple configurations in order to alter a signal path of the wireless receiver 200 as described above, the wireless receiver 200 may establish a robust connection with a RAN device or a similar RF entity, thus resulting in more efficient usage of network resources. More particularly, based on at least one of the one or more antenna elements 244, the reversible cover 202, or a mounting bracket 218, 228, 234 being movable with respect to the receiver body 204 in order to align the wireless receiver 200 with a signal path from a RAN device, the wireless receiver 200 may be capable of establishing a robust connection with a RAN device or a similar RF entity, resulting in reduced communication errors and thus reduced power, computing, and communication resource consumption that would otherwise be required for correcting communication errors; increased bandwidth and reduced latency with respect to the client device communications; and otherwise more efficient usage of network resources.

As indicated above, FIGS. 2A-2R are provided as an example. Other examples may differ from what is described with regard to FIGS. 2A-2R. The number and arrangement of devices shown in FIGS. 2A-2R are provided as an example. In practice, there may be additional devices, fewer devices, different devices, or differently arranged devices than those shown in FIGS. 2A-2R. Furthermore, two or more devices shown in FIGS. 2A-2R may be implemented within a single device, or a single device shown in FIGS. 2A-2R may be implemented as multiple, distributed devices. Additionally, or alternatively, a set of devices (e.g., one or more devices) shown in FIGS. 2A-2R may perform one or more functions described as being performed by another set of devices shown in FIGS. 2A-2R.

Figure 3:
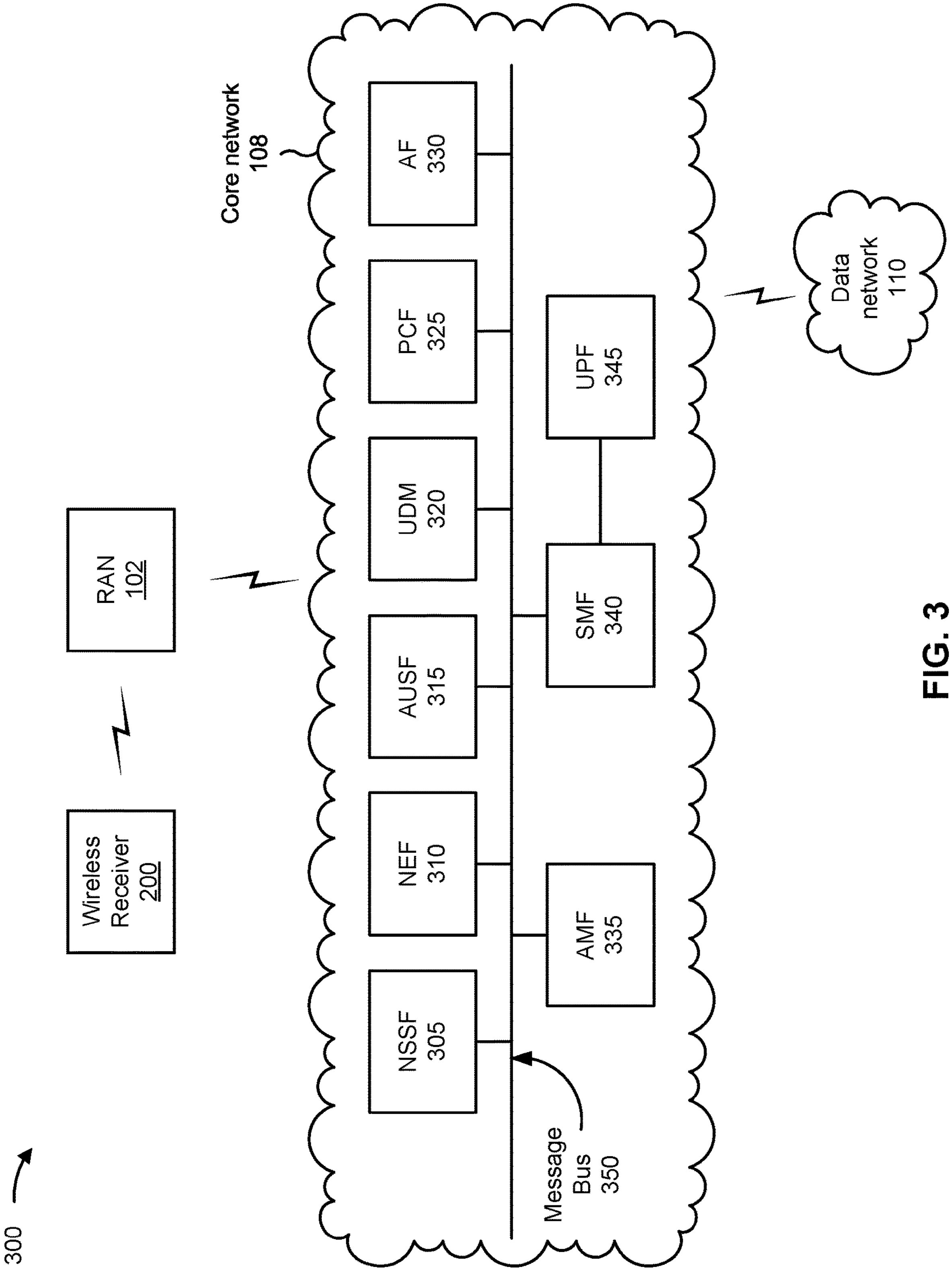
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a wireless receiver 200, a RAN device 102, a core network 108, and a data network 110. Devices and/or networks of example environment 300 may interconnect via wired connections, wireless connections, or a combination of wired and wireless connections.

The wireless receiver 200 includes one or more devices capable of receiving, generating, storing, processing, and/or providing information, such as information described herein. For example, the wireless receiver 200 can include a mobile hotspot device, an FWA device, customer premises equipment, or a similar type of device.

The RAN device 102 may support, for example, a cellular RAT. The RAN device 102 may include one or more base stations (e.g., base transceiver stations, radio base stations, node Bs, eNBs, gNBs, base station subsystems, cellular sites, cellular towers, access points, TRPs, radio access nodes, macrocell base stations, microcell base stations, picocell base stations, femtocell base stations, or similar types of devices) and other network entities that can support wireless communication for the wireless receiver 200. The RAN device 102 may transfer traffic between the wireless receiver 200 (e.g., using a cellular RAT), one or more base stations (e.g., using a wireless interface or a backhaul interface, such as a wired backhaul interface), and/or the core network 108. The RAN device 102 may provide one or more cells that cover geographic areas.

In some implementations, the RAN device 102 may perform scheduling and/or resource management for the wireless receiver 200 covered by the RAN device 102 (e.g., the wireless receiver 200 covered by a cell provided by the RAN device 102). In some implementations, the RAN device 102 may be controlled or coordinated by a network controller, which may perform load balancing, network-level configuration, and/or other operations. The network controller may communicate with the RAN device 102 via a wireless or wireline backhaul. In some implementations, the RAN device 102 may include a network controller, a self-organizing network (SON) module or component, or a similar module or component. In other words, the RAN device 102 may perform network control, scheduling, and/or network management functions (e.g., for uplink, downlink, and/or sidelink communications of the wireless receiver 200 covered by the RAN device 102).

In some implementations, the core network 108 may include an example functional architecture in which systems and/or methods described herein may be implemented. For example, the core network 108 may include an example architecture of a 5G next generation (NG) core network included in a 5G wireless telecommunications system. While the example architecture of the core network 108 shown in FIG. 3 may be an example of a service-based architecture, in some implementations, the core network 108 may be implemented as a reference-point architecture and/or a 4G core network, among other examples.

As shown in FIG. 3, the core network 108 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, and/or a user plane function (UPF) 345. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 305 includes one or more devices that select network slice instances for the wireless receiver 200. By providing network slicing, the NSSF 305 allows an operator to deploy multiple substantially independent end-to-end networks potentially with the same infrastructure. In some implementations, each slice may be customized for different services.

The NEF 310 includes one or more devices that support exposure of capabilities and/or events in the wireless telecommunications system to help other entities in the wireless telecommunications system discover network services.

The AUSF 315 includes one or more devices that act as an authentication server and support the process of authenticating the wireless receiver 200 in the wireless telecommunications system.

The UDM 320 includes one or more devices that store user data and profiles in the wireless telecommunications system. The UDM 320 may be used for fixed access and/or mobile access in the core network 108.

The PCF 325 includes one or more devices that provide a policy framework that incorporates network slicing, roaming, packet processing, and/or mobility management, among other examples.

The AF 330 includes one or more devices that support application influence on traffic routing, access to the NEF 310, and/or policy control, among other examples.

The AMF 335 includes one or more devices that act as a termination point for non-access stratum (NAS) signaling and/or mobility management, among other examples.

The SMF 340 includes one or more devices that support the establishment, modification, and release of communication sessions in the wireless telecommunications system. For example, the SMF 340 may configure traffic steering policies at the UPF 345 and/or may enforce user equipment Internet protocol (IP) address allocation and policies, among other examples.

The UPF 345 includes one or more devices that serve as an anchor point for intraRAT and/or interRAT mobility. The UPF 345 may apply rules to packets, such as rules pertaining to packet routing, traffic reporting, and/or handling user plane QoS, among other examples.

The message bus 350 represents a communication structure for communication among the functional elements. In other words, the message bus 350 may permit communication between two or more functional elements.

The data network 110 includes one or more wired and/or wireless data networks. For example, the data network 110 may include an IP Multimedia Subsystem (IMS), a public land mobile network (PLMN), a LAN, a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
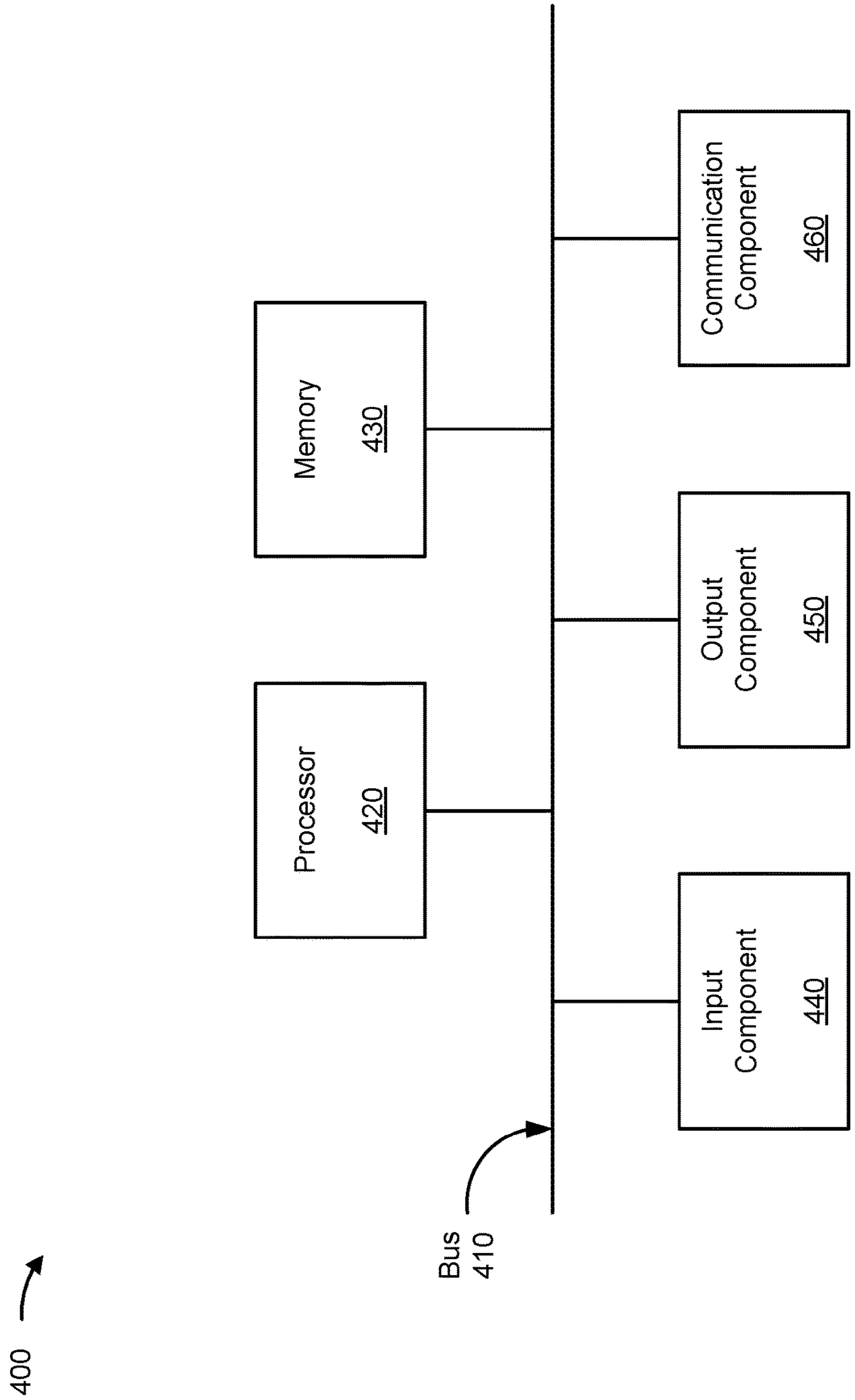
FIG. 4 is a diagram of example components of a device associated with a wireless receiver having multiple antenna configurations.

FIG. 4 is a diagram of example components of a device 400 associated with a wireless receiver having multiple antenna configurations. The device 400 may correspond to the wireless receiver 104, the wireless receiver 200, the RAN device 102, any of the devices described above in connection with the core network 108, and/or a device associated with the data network 110. In some implementations, the wireless receiver 104, the wireless receiver 200, the RAN device 102, any of the devices described above in connection with the core network 108, and/or a device associated with the data network 110 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
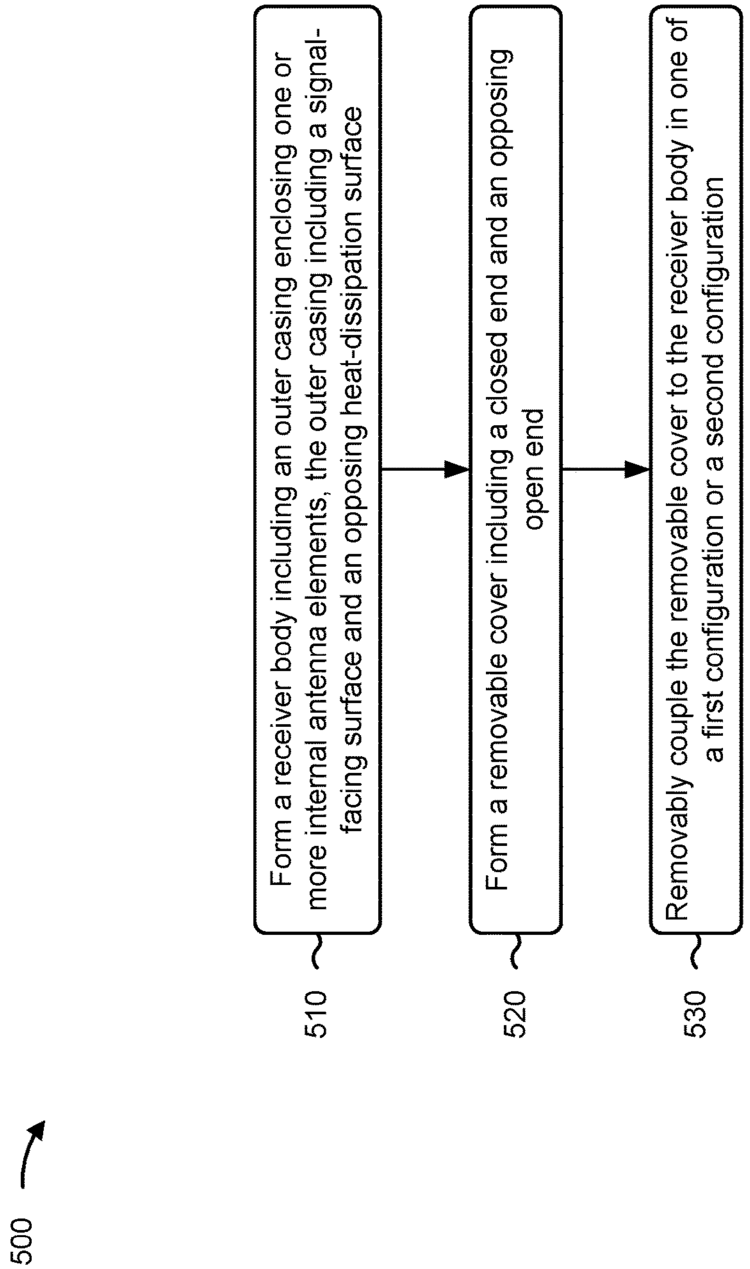
FIG. 5 is a flowchart of an example process associated with manufacturing a wireless receiver having multiple antenna configurations.

FIG. 5 is a flowchart of an example process 500 associated with manufacturing a wireless receiver having multiple antenna configurations. For example, the example process 500 may be associated with manufacturing the wireless receiver 200 described above in connection with FIGS. 2A-2R. In some implementations, one or more process blocks of FIG. 5 may be performed by various manufacturing equipment (e.g., various electronic device manufacturing equipment).

As shown in FIG. 5, process 500 may include forming a receiver body including an outer casing enclosing one or more internal antenna elements, the outer casing including a signal-facing surface and an opposing heat-dissipation surface (block 510). For example, the electronic device manufacturing equipment may form a receiver body including an outer casing enclosing one or more internal antenna elements, the outer casing including a signal-facing surface and an opposing heat-dissipation surface, as described above. In some implementations, process 500 includes mounting the one or more internal antenna elements within the outer casing of the receiver body via a pivot mechanism such that the one or more internal antenna elements are configured to rotate about an axis via the pivot mechanism. Additionally, or alternatively, process 500 may include forming an Ethernet port in the outer casing of the receiver body configured to supply power to the one or more internal antenna elements.

As further shown in FIG. 5, process 500 may include forming a removable cover including a closed end and an opposing open end (block 520). For example, the electronic device manufacturing equipment may form a removable cover including a closed end and an opposing open end, as described above.

As further shown in FIG. 5, process 500 may include removably coupling the removable cover to the receiver body in one of a first configuration or a second configuration (block 530). For example, the electronic device manufacturing equipment may removably couple the removable cover to the receiver body in one of a first configuration or a second configuration. In some implementations, when the removable cover is removably coupled to the wireless receiver in the first configuration, the removable cover is coupled to the receiver body such that the closed end of the removable cover is disposed proximate to the signal-facing surface of the receiver body and such that the open end of the removable cover is disposed proximate to the heat-dissipation surface of the receiver body, and, when the removable cover is removably coupled to the wireless receiver in the second configuration, the removable cover is coupled to the receiver body such that the closed end of the removable cover is disposed proximate to the heat-dissipation surface of the receiver body and such that the open end of the removable cover is disposed proximate to the signal-facing surface of the receiver body, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known “opt-in” or “opt-out” processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiple of the same item.

When “a processor” or “one or more processors” (or another device or component, such as “a controller” or “one or more controllers”) is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of “first processor” and “second processor” or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form “one or more processors configured to: perform X; perform Y; and perform Z,” that claim should be interpreted to mean “one or more processors configured to perform X; one or more (possibly different) processors configured to perform Y; and one or more (also possibly different) processors configured to perform Z.”

No element, act, or instruction used herein should be construed as critical or essential unless explicitly described as such. Also, as used herein, the articles “a” and “an” are intended to include one or more items, and may be used interchangeably with “one or more.” Further, as used herein, the article “the” is intended to include one or more items referenced in connection with the article “the” and may be used interchangeably with “the one or more.” Furthermore, as used herein, the term “set” is intended to include one or more items (e.g., related items, unrelated items, or a combination of related and unrelated items), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A wireless receiver, comprising:
a receiver body encompassing one or more antenna elements,
wherein the receiver body includes an outer casing with one or more grooves;
a cover removably coupled to the receiver body,
wherein the cover includes one or more protrusions which extend inward from an interior surface of the cover; and
a mounting bracket removably coupled to the receiver body,
wherein at least one of the one or more antenna elements, the cover, or the mounting bracket is movable with respect to the receiver body in order to align the wireless receiver with a signal path in a radio access network, and
wherein the cover is moved in a direction based on the one or more protrusions and the one or more grooves,
wherein the one or more protrusions follow a contour of the one or more grooves to guide movement of the cover relative to the receiver body.

2. The wireless receiver of claim 1,
wherein the cover includes a closed end and an opposing open end configured to removably receive the receiver body therethrough,
and wherein, to align the wireless receiver with the signal path, the cover is movable between:
a first position, in which the cover is coupled to the receiver body such that the closed end of the cover is disposed proximate to a signal-facing surface of the receiver body, and
a second position, in which the cover is coupled to the receiver body such that the open end of the cover is disposed proximate to the signal-facing surface of the receiver body.

3. The wireless receiver of claim 1,
wherein the one or more antenna elements are mounted within the wireless receiver via a pivot mechanism, and wherein, to align the wireless receiver with the signal path, the one or more antenna elements are configured to rotate about an axis via the pivot mechanism.

4. The wireless receiver of claim 3, wherein, to align the wireless receiver with the signal path, the one or more antenna elements are configured to automatically rotate about the axis upon the wireless receiver being powered up.

5. The wireless receiver of claim 1,
wherein the one or more antenna elements include at least:
a first antenna element associated with a long term evolution frequency band,
a second antenna element associated with a C-band frequency band, and
a third antenna element associated with a millimeter wave frequency band.

6. The wireless receiver of claim 1, wherein, to align the wireless receiver with the signal path, the mounting bracket is movable between:
a first position, in which the mounting bracket is coupled to the receiver body such that the mounting bracket is disposed proximate to a signal-facing surface of the receiver body, and
a second position, in which the mounting bracket is coupled to the receiver body such that the mounting bracket is disposed proximate to a surface of the receiver body opposite from the signal-facing surface.

7. The wireless receiver of claim 1,
wherein the mounting bracket includes a rotating mechanism such that the receiver body is rotatable with respect to the mounting bracket.

8. The wireless receiver of claim 1, wherein, to align the wireless receiver with the signal path, the mounting bracket includes a wedge mechanism such that the receiver body is tiltable with respect to a mounting surface.

9. The wireless receiver of claim 1, further comprising
an Ethernet port configured to supply power to the one or more antenna elements.

10. A multi-configuration wireless receiver, comprising:
a receiver body encompassing one or more antenna elements,
wherein the receiver body includes a signal-facing surface, and
wherein the receiver body includes an outer casing with one or more grooves;
a removable cover removably couplable to the receiver body,
wherein the removable cover includes a closed end and an opposing open end configured to removably receive the receiver body therein, and
wherein the removable cover includes one or more protrusions which extend from an interior surface of the removable cover; and
a mounting bracket removably couplable to the receiver body via the open end of the removable cover,
wherein, when the multi-configuration wireless receiver is in a first configuration, the removable cover is coupled to the receiver body such that the closed end of the removable cover is disposed proximate to the signal-facing surface of the receiver body,
wherein, when the multi-configuration wireless receiver is in a second configuration, the removable cover is coupled to the receiver body such that the open end of the removable cover is disposed proximate to the signal-facing surface of the receiver body, and
wherein the removable cover is moved in a direction based on the one or more protrusions and the one or more grooves,
wherein the one or more protrusions follow a contour of the one or more grooves to guide movement of the removable cover relative to the receiver body.

11. The multi-configuration wireless receiver of claim 10,
wherein the one or more antenna elements are mounted within the wireless receiver via a pivot mechanism, and
wherein the one or more antenna elements are configured to rotate about an axis via the pivot mechanism and receive a signal via the signal-facing surface of the receiver body.

12. The multi-configuration wireless receiver of claim 11,
wherein the one or more antenna elements are configured to automatically rotate about the axis upon the wireless receiver being powered up.

13. The multi-configuration wireless receiver of claim 10, wherein the one or more antenna elements include at least:

a first antenna element associated with a long term evolution frequency band, a second antenna element associated with a C-band frequency band, and a third antenna element associated with a millimeter wave frequency band.

14. The multi-configuration wireless receiver of claim 10, wherein, when the multi-configuration wireless receiver is in the first configuration, the mounting bracket is coupled to the receiver body such that the mounting bracket is disposed proximate a surface of the receiver body opposite to the signal-facing surface of the receiver body, and wherein, when the multi-configuration wireless receiver is in the second configuration, the mounting bracket is coupled to the receiver body such that the mounting bracket is disposed proximate to the signal-facing surface of the receiver body.

15. The multi-configuration wireless receiver of claim 10, wherein the mounting bracket includes a rotating mechanism such that the receiver body is rotatable with respect to the mounting bracket.

16. The multi-configuration wireless receiver of claim 10, wherein the mounting bracket includes a wedge mechanism such that the receiver body is tiltable with respect to a mounting surface.

17. The multi-configuration wireless receiver of claim 10, further comprising an Ethernet port configured to supply power to the one or more antenna elements.

18. A method of manufacturing a wireless receiver, comprising:

forming a receiver body including an outer casing enclosing one or more internal antenna elements, wherein the outer casing includes a signal-facing surface and one or more grooves;

forming a removable cover including a closed end and an opposing open end, wherein the removable cover includes one or more protrusions; and removably coupling the removable cover to the receiver body in one of a first configuration or a second configuration, wherein, when the removable cover is removably coupled to the wireless receiver in the first configuration, the removable cover is coupled to the receiver body such that the closed end of the removable cover is disposed proximate to the signal-facing surface of the receiver body, wherein, when the removable cover is removably coupled to the wireless receiver in the second configuration, the removable cover is coupled to the receiver body such that the open end of the removable cover is disposed proximate to the signal-facing surface of the receiver body, and wherein the removable cover is moved in a direction based on the one or more protrusions and the one or more grooves, wherein the one or more protrusions follow a contour of the one or more grooves to guide movement of the removable cover relative to the receiver body.

19. The method of claim 18, further comprising mounting the one or more internal antenna elements within the outer casing of the receiver body via a pivot mechanism such that the one or more internal antenna elements are configured to rotate about an axis via the pivot mechanism.

20. The method of claim 18, further comprising forming an Ethernet port in the outer casing of the receiver body configured to supply power to the one or more internal antenna elements.

* * * * *